United States Patent
Watanabe et al.

(10) Patent No.: US 9,256,924 B2
(45) Date of Patent: Feb. 9, 2016

(54) IMAGE PROCESSING DEVICE, MOVING-IMAGE PROCESSING DEVICE, VIDEO PROCESSING DEVICE, IMAGE PROCESSING METHOD, VIDEO PROCESSING METHOD, TELEVISION RECEIVER, PROGRAM, AND RECORDING MEDIUM

(71) Applicant: Sharp Kabushiki Kaisha, Osaka-shi, Osaka (JP)

(72) Inventors: Mihoko Watanabe, Osaka (JP); Akira Koike, Osaka (JP); Yoshinori Kohno, Osaka (JP); Shigeki Taniguchi, Osaka (JP); Masahiko Takiguchi, Osaka (JP); Ichiro Mizobuchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/401,070

(22) PCT Filed: Apr. 18, 2013

(86) PCT No.: PCT/JP2013/061546
§ 371 (c)(1),
(2) Date: Nov. 13, 2014

(87) PCT Pub. No.: WO2013/172149
PCT Pub. Date: Nov. 21, 2013

(65) Prior Publication Data
US 2015/0103250 A1  Apr. 16, 2015

(30) Foreign Application Priority Data

May 16, 2012 (JP) ................................ 2012-112793
May 17, 2012 (JP) ................................ 2012-113833
Mar. 28, 2013 (JP) ................................ 2013-070517

(51) Int. Cl.
G06T 5/00 (2006.01)
H04N 5/21 (2006.01)
(Continued)

(52) U.S. Cl.
CPC ................ *G06T 5/002* (2013.01); *G06T 5/007* (2013.01); *G06T 5/40* (2013.01); *H04N 5/142* (2013.01);
(Continued)

(58) Field of Classification Search
CPC ....................................................... G06T 5/002
USPC ......... 348/576, 607, 611, 614, 612, 618, 622, 348/625; 382/176, 164
See application file for complete search history.

(56) References Cited

U.S. PATENT DOCUMENTS 5,872,864 A * 2/1999 Imade et al. .................. 382/176
8,780,262 B2 * 7/2014 Kaida .......................... 348/364
(Continued)

FOREIGN PATENT DOCUMENTS

CN 1917578 A 2/2007
CN 101489034 A 7/2009
(Continued)

*Primary Examiner* — Paulos M Natnael
(74) *Attorney, Agent, or Firm* — Birch, Stewart, Kolasch & Birch, LLP

(57) ABSTRACT

A video processing device (100) includes: an edge histogram generating section (141) and a noise reducing section (150). The generating section (141) generates an edge histogram of a decoded image obtained from a video signal. The noise reducing section (150) (i) determines whether or not a ratio of a sum of frequencies of classes higher than a predetermined class of an edge histogram to a sum of all frequencies the edge histogram is equal to or greater than a predetermined threshold value and (ii) performs a smoothing process on the decoded image with a smoothing intensity adjusted in accordance with whether or not the ratio is equal to or greater than the predetermined threshold value.

19 Claims, 13 Drawing Sheets

(51) Int. Cl.
*G06T 5/40* (2006.01)
*H04N 5/14* (2006.01)
*H04N 9/64* (2006.01)

(52) U.S. Cl.
CPC ............. *H04N 5/21* (2013.01); *H04N 9/646* (2013.01); *G06T 2207/10004* (2013.01); *G06T 2207/10016* (2013.01); *G06T 2207/10024* (2013.01); *G06T 2207/20012* (2013.01); *G06T 2207/20182* (2013.01)

(56) References Cited

U.S. PATENT DOCUMENTS

| | | | |
|---|---|---|---|
| 2007/0070214 A1* | 3/2007 | Nakamura | 348/222.1 |
| 2007/0110329 A1 | 5/2007 | Moon et al. | |
| 2009/0232407 A1 | 9/2009 | Aoyama et al. | |
| 2010/0033497 A1* | 2/2010 | Ueno et al. | 345/611 |
| 2010/0069757 A1* | 3/2010 | Yoshikawa et al. | 600/454 |
| 2010/0231798 A1 | 9/2010 | Aoyama | |
| 2010/0260412 A1* | 10/2010 | Yamazaki | 382/164 |
| 2010/0260413 A1* | 10/2010 | Yamazaki | 382/164 |
| 2012/0169789 A1 | 7/2012 | Origuchi et al. | |
| 2014/0093177 A1* | 4/2014 | Hayashi et al. | 382/199 |

FOREIGN PATENT DOCUMENTS

| | | |
|---|---|---|
| JP | 2004-198479 A | 7/2004 |
| JP | 2009-246958 A | 10/2009 |
| JP | 4550016 B2 | 9/2010 |
| JP | 2011-29989 A | 2/2011 |
| JP | 2011-81335 A | 4/2011 |

* cited by examiner

|  |  | RATIO OF INTER-FRAME VARIANCE IN LUMINANCE DISTRIBUTION | | |
|---|---|---|---|---|
|  |  | EQUAL TO OR LESS THAN 10% | 10-15% | EQUAL TO OR GREATER THAN 15% |
| RATIO OF NUMBER OF PIXELS HAVING LARGE INTER-FRAME LUMINANCE DIFFERENCES | EQUAL TO OR GREATER THAN 19% | HIGH | MODERATE | LOW |
|  | 15-19% | MODERATE | LOW | ZERO |
|  | EQUAL TO OR LESS THAN 15% | LOW | ZERO | ZERO |

FIG. 13

| INTENSITY OF NR | EDGE THRESHOLD VALUE OF LUMINANCE DIFFERENCE | NOISE THRESHOLD VALUE OF EVENNESS |
|---|---|---|
| ZERO | — | — |
| LOW | 15 | 96 |
| MODERATE | 10 | 144 |
| HIGH | 5 | 192 |

IMAGE PROCESSING DEVICE, MOVING-IMAGE PROCESSING DEVICE, VIDEO PROCESSING DEVICE, IMAGE PROCESSING METHOD, VIDEO PROCESSING METHOD, TELEVISION RECEIVER, PROGRAM, AND RECORDING MEDIUM

TECHNICAL FIELD

The present invention mainly relates to an image processing device and to an image processing method, each of which is intended for improving the quality of a moving image and/or a still image.

BACKGROUND ART

Conventionally, there have been various technologies developed for improving the quality of a video.

Patent Literature 1 discloses a luminance conversion device developed with the aim of properly highlighting contrast of even a person whose image is captured in front of a wall surface of a building, which wall surface has little luminance variation. The luminance conversion device of Patent Literature 1 is configured to (i) obtain (a) a luminance histogram indicative of the respective numbers of pixels of input images in different luminances and (b) an edge histogram indicative of the respective numbers of edges in the different luminances and (ii) convert the luminance of an input image by use of the two histograms.

There has also been a technology developed for reducing noise that occurs in the process of decoding a video which has been compression-encoded.

For example, in many cases, an image compressed with a compression-encoding system such as MPEG or JPEG that is high in compressibility has edges around which mosquito noise is generated. The occurrence of mosquito noise, which is a cause for deterioration of image quality, can be reduced by a smoothing process.

CITATION LIST

Patent Literature

Patent Literature 1
Japanese Patent No. 4550016 (Publication Date: Dec. 27, 2007)

SUMMARY OF INVENTION

Technical Problem

A smoothing process is effective in reducing noise. However, in a case where an image having little mosquito noise (i.e., image having been compressed with a low compressibility or having few edges) is subjected to a high-intensity smoothing process, an adverse effect on the image quality such as "blurring of the image" outweighs a favorable effect on an image quality such as "noise reduction."

In this respect, conventional video processing devices in some cases end up even lowering the quality of a video by performing a high-intensity smoothing process on not only images having much mosquito noise but also images having little mosquito noise.

The present invention has been made in view of the problem, and it is a main object of the present invention to realize an image processing device capable of performing an effective smoothing process on an image in accordance with features of the image.

Solution to Problem

In order to attain the object, an image processing device in accordance with one aspect of the present invention includes: first generating means for generating, as first frequency distribution data, frequency distribution data concerning how large luminance differences are between (i) pixels constituting an image and (ii) their respective adjacent pixels; first determining means for determining whether or not a first ratio of a sum of frequencies of classes higher than a predetermined class of the first frequency distribution data to a sum of all frequencies of the first frequency distribution data is equal to or greater than a first predetermined threshold value; smoothing means for performing a smoothing process on the image; and adjusting means for adjusting a smoothing intensity of the smoothing process in accordance with whether or not the first determining means determines that the first ratio is equal to or greater than the first predetermined threshold value, the smoothing means being configured to perform the smoothing process on the image with the smoothing intensity that has been adjusted by the adjusting means.

In order to attain the object, an image processing method in accordance with one aspect of the present invention includes the steps of: (a) generating frequency distribution data concerning how luminance differences are between (i) pixels constituting an image and (ii) their respective adjacent pixels; (b) determining whether or not a ratio of a sum of frequencies of classes higher than a predetermined class of the frequency distribution data to a sum of all frequencies of the frequency distribution data is equal to or greater than a predetermined threshold value; (c) performing a smoothing process on the image; and (d) adjusting a smoothing intensity of the smoothing process in accordance with whether or not it is determined in the step (b) that the ratio is equal to or greater than the predetermined threshold value, in the step (c), a smoothing process being performed on the image with a smoothing intensity that has been adjusted in the step (d).

Advantageous Effects of Invention

As has been described, an image processing device in accordance with one aspect of the present invention brings about such an effect that an effective smoothing process can be performed on an image in accordance with features of the image.

BRIEF DESCRIPTION OF DRAWINGS

FIG. 13 is a view showing an example of a block noise detection table stored in a storage section of the video processing device illustrated in FIG. 12.

DESCRIPTION OF EMBODIMENTS

Embodiment 1

A video processing device in accordance with one embodiment of the present invention is equipped with a function (noise reduction (NR) function) to reduce mosquito noise in a video (moving image) based on a video signal that has been inputted. Specifically, the video processing device of Embodiment 1 is configured such that whether a target decoded image of decoded images each obtained by decoding a video signal is subjected to a high-intensity noise reduction process (specifically, smoothing process) or to a low-intensity noise reduction process is determined in accordance with (i) an edge histogram (corresponding to "first frequency distribution data" recited in the Claims) of the target decoded image and (ii) a luminance histogram (corresponding to "second frequency distribution data" recited in the Claims) of the target decoded image.

The following description will discuss, with reference to the drawings, the details of the video processing device in accordance with Embodiment 1.

Figure 1:
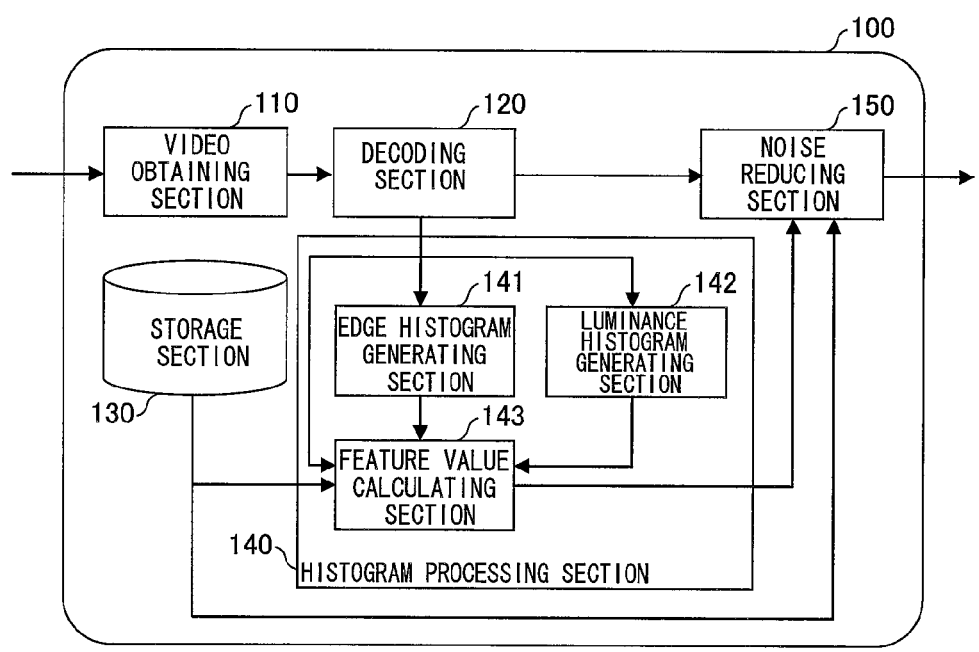
FIG. 1 is a block diagram illustrating a main configuration of a video processing device in accordance with one embodiment of the present invention.

A configuration of the video processing device Embodiment 1 will be described below with reference to FIG. 1. FIG. 1 is a block diagram illustrating a main configuration of a video processing device 100. As illustrated in FIG. 1, the video processing device 100 includes a video obtaining section 110, a decoding section 120, a storage section 130, a histogram processing section 140, and a noise reducing section 150.

(Video Obtaining Section 110)

The video obtaining section 110 receives a video signal that has been obtained by converting a video into a signal. Examples of a source from which to receive the video signal encompass any form of video signal sources such as a broadcast wave and video data which is stored in a storage medium.

(Decoding Section 120)

The decoding section 120 decodes the video signal supplied from the video obtaining section 110.

The video signal to be decoded by the decoding section 120 is compression-encoded with the use of, for example, MPEG-1, MPEG-2, H.264/MPEG-4.AVC, or the like.

The decoding section 120 generates decoded images (corresponding to "image frames" recited in the Claims) one after another, based on the video signal. The decoding section 120 generates a decoded image by, for example, (i) generating a prediction image either by in-screen prediction (intra prediction) or by inter-screen prediction (inter prediction) and then (ii) adding, to pixel values of the prediction image, corresponding pixel values obtained by decoding the video signal.

The decoding section 120 supplies each of the decoded images to the histogram processing section 140 and to the noise reducing section 150.

(Storage Section 130)

The storage section 130 stores various threshold values for determining whether to a high-intensity noise reduction process or to a low-intensity noise reduction process is performed on a target decoded image. The storage section 130 can be configured by, for example, a storage device such as an HDD (Hard Disk Drive).

(Histogram Processing Section 140)

The histogram processing section 140 includes an edge histogram generating section 141, a luminance histogram generating section 142, and a feature value calculating section 143.

The edge histogram generating section 141 generates an edge histogram of the target decoded image. Specifically, the edge histogram generating section 141 generates an edge histogram concerning how large a luminance difference is between (i) each one (target pixel) of pixels constituting the target decoded image and (ii) a pixel adjacent to said each one of the pixels.

The luminance histogram generating section 142 generates a luminance histogram of the target decoded image. Specifically, luminance histogram generating section 142 generates a luminance histogram concerning the level of a luminance of each one (target pixel) of pixels constituting the target decoded image.

Based on the edge histogram generated by the edge histogram generating section 141, the luminance histogram generated by the luminance histogram generating section 142, and the threshold values stored in the storage section 130, the feature value calculating section 143 calculates feature values (a feature value of the edge histogram and a feature value of the luminance histogram) concerning the target decoded image.

The feature value calculating section 143 also calculates, as one of the feature values concerning the target decoded image, an average picture level (APL) of the target decoded image.

(Noise Reducing Section 150)

The noise reducing section 150 determines whether or not each (target one) of the three feature values supplied from the histogram processing section 140 is equal to or greater than a corresponding one of the threshold values stored in the storage section 130.

In accordance with results thus determined concerning the three feature values, the noise reducing section 150 determines whether the target decoded image supplied from the decoding section 120 is to be subjected to a high-intensity noise reduction process or to a low-intensity noise reduction process.

The noise reducing section 150 then supplies, to a device outside of the video processing device 100, a target decoded image that has been subjected to a noise reduction process with intensity thus determined.

The configuration of the video processing device 100 has been thus described above.

Next, a decoded image whose quality can easily deteriorate due to mosquito noise will be described below.

(Decoded Image Whose Quality can Easily Deteriorate Due to Mosquito Noise)

1. The quality of a decoded image having many edges easily deteriorates due to mosquito noise. This is because mosquito noise tends to occur at edges in an image. For example, a decoded image of a subject such as an entire portion of a cherry tree, an entire portion of a mountain covered with autumn colors, and many runners running in a marathon, contain many edges. Mosquito noise tends to occur in such a decoded image. Furthermore, in a case where a compressibility of a video signal is high, the quality of a decoded image may sharply deteriorate due to mosquito noise.

In this regard, the video processing device 100 is configured to (i) calculate, from a target decoded image, a feature value concerning an edge histogram of the target decoded image and (ii) identify, as a "decoded image containing many edges", a target decoded image having a feature value equal to or greater than a threshold value.

2. A decoded image including many middle-gradation pixels and/or many high-gradation pixels can easily deteriorate due to mosquito noise. This is because, while mosquito noise is not very noticeable when occurring at a low-gradation part(s) of a decoded image, the mosquito noise is noticeable when occurring at a middle-gradation and/or high-gradation part(s) of the decoded image.

In this regard, the video processing device 100 is configured to (i) calculate, from a target decoded image, a feature value concerning a luminance histogram of the target decoded image and (ii) identify, as a "decoded image containing many middle-gradation pixels and/or high-gradation pixels", a target decoded image having a feature value equal to or greater than a threshold value.

3. A decoded image whose overall brightness is high can easily deteriorate due to mosquito noise. This is because a decoded image whose overall brightness is high renders mosquito noise more noticeable than does a decoded image whose overall brightness is low.

In this regard, the video processing device 100 is configured to (i) calculate, from a target decoded image, an average picture level of the target decoded image and (ii) identify, as a "decoded image whose overall brightness is high", a target decoded image having an average picture level equal to or greater than a threshold value.

(Operation of Video Processing Device 100)

Next, a noise reduction process-related operation of the video processing device 100 will be described below with reference to FIGS. 2 through 4.

Figure 2:
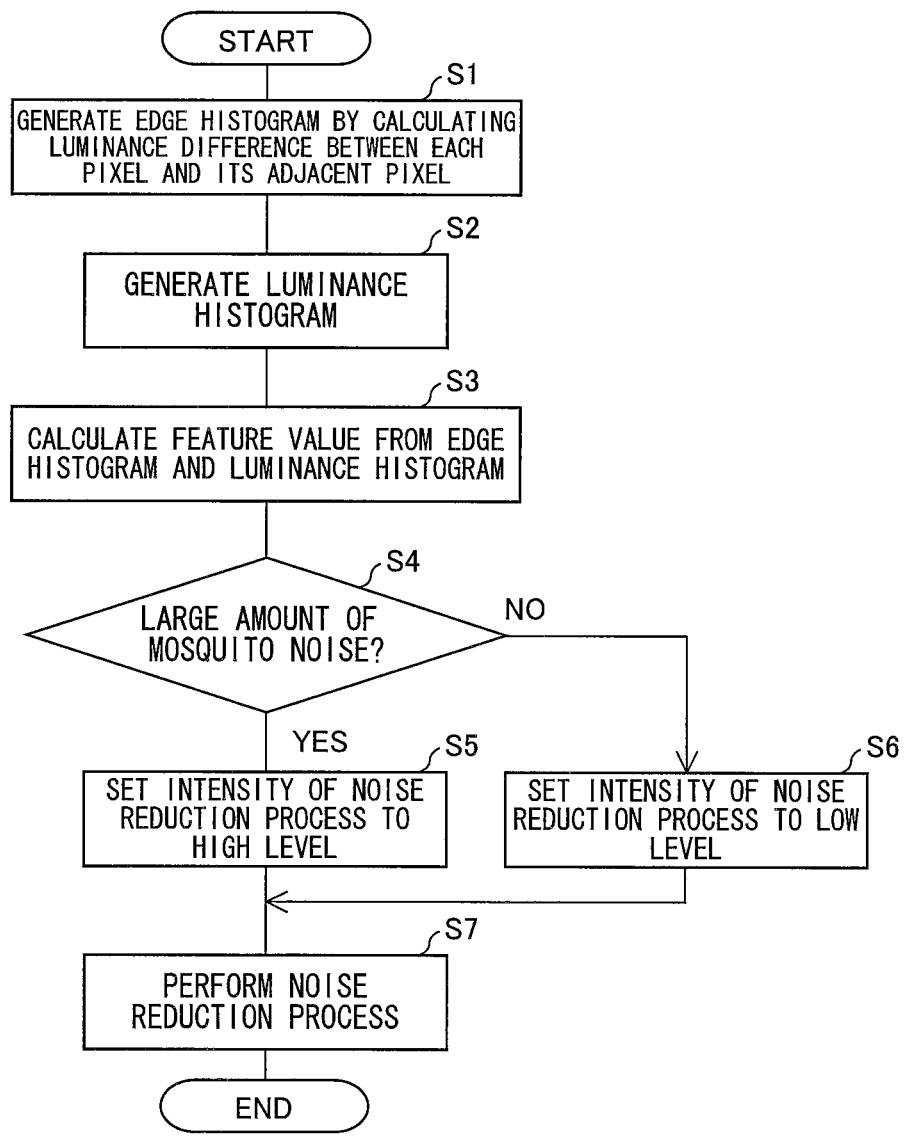
FIG. 2 is a flow chart showing an exemplary operation of the video processing device illustrated in FIG. 1.

FIG. 2 is a flow chart showing the noise reduction process-related operation of the video processing device 100. FIGS. 3 and 4 are views illustrating an edge histogram and a luminance histogram, respectively, which are generated by the video processing device 100 based on a target decoded image.

(Step 1: Generating Edge Histogram)

Figure 3:
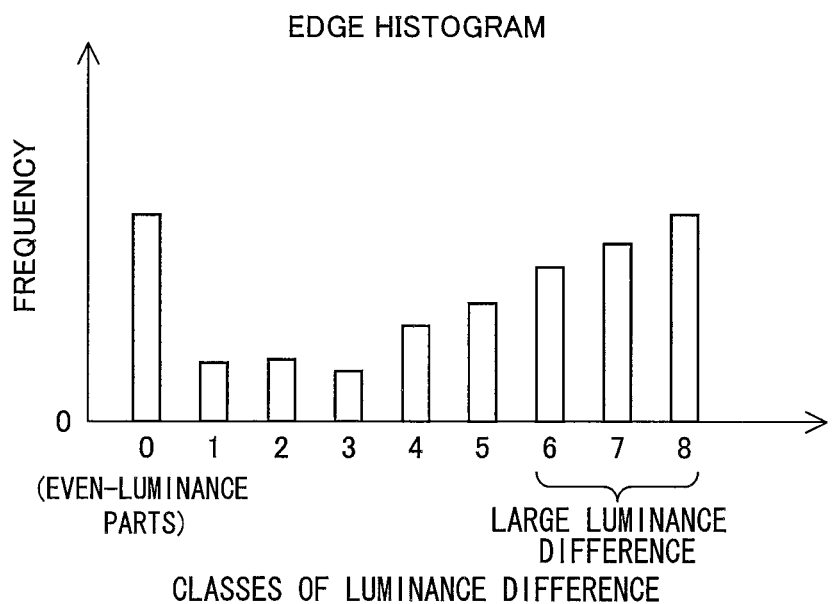
FIG. 3 is a view showing an exemplary edge histogram generated by the video processing device illustrated in FIG. 1.

Based on a target decoded image (i.e. a target decoded image generated by the decoding section 120 based on a video signal received from the video obtaining section 110) supplied from the decoding section 120, the edge histogram generating section 141 generates an edge histogram including 9 classes as illustrated in FIG. 3. Specifically, the edge histogram generating section 141 (I) calculates a luminance difference between (a) each one (target pixel) of pixels constituting the target decoded image and (b) a pixel adjacent to said one of the pixels and (II) generates an edge histogram in which a frequency $N_i$ of a class i of classes 0 through 8 indicates the number of pixels that yield luminance differences belonging to the class i.

As is clear from FIG. 3, the edge histogram generated by the edge histogram generating section 141 is a histogram in which (I) a frequency $N_0$ of the class 0 indicates the number of pixels, each of which has a luminance that is no different (i.e. 0 luminance difference) from that of its adjacent pixel and (II) the following expression is true: class value (=0) of class 0<class value of class 1<class value of class 2< . . . <class value of class 8. Note that, according to the present invention, there are no particular limitations on the number of classes of the edge histogram generated and on a class interval of each class.

(Step 2: Generating Luminance Histogram)

Figure 4:
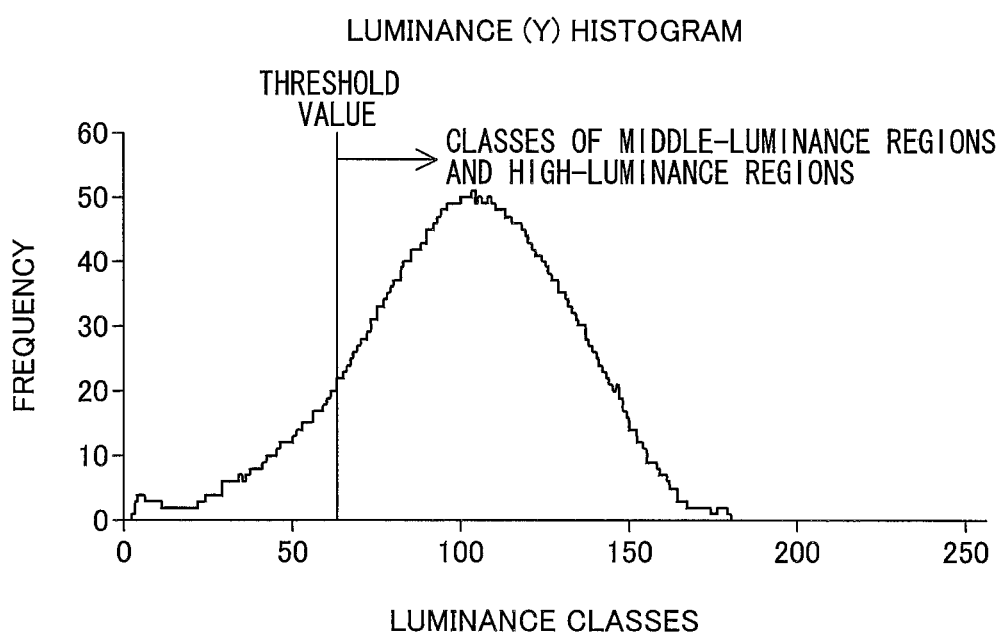
FIG. 4 is a view showing an exemplary luminance histogram generated by the video processing device illustrated in FIG. 1.

The luminance histogram generating section 142 generates, based on the target decoded image, a luminance edge histogram illustrated in FIG. 4. According to the present invention, as is the case of the edge histogram, there are no particular limitations on the number of classes of the luminance histogram and on a class interval of each class.

(Step 3: Calculating Feature Value)

The feature value calculating section 143 calculates feature values from the edge histogram and the luminance histogram.

Specifically, the feature value calculating section 143 reads out, from the storage section 130, a predetermined threshold value concerning the edge histogram (which threshold value is an upper limit of the class 5 of the edge histogram and is a lower limit of the class 6 of the edge histogram). Then, the feature value calculating section 143 calculates a ratio of (a) a total number of pixels, each of which is a pixel whose luminance difference from its adjacent pixel is greater than the threshold value thus read out (i.e. the sum of frequencies of the respective classes 6 through 8, which classes are higher than class 5) to (b) all the frequencies of the edge histogram (i.e. the sum of all the frequencies of the classes 0 through 8). Then, the feature value calculating section 143 supplies, to the noise reducing section 150, the ratio as a feature value of the edge histogram.

In addition, the feature value calculating section 143 reads out, from the storage section 130, a predetermined threshold value concerning the luminance histogram (which threshold value is an upper limit of classes belonging to a low gradation region of the luminance histogram and is a lower limit of classes belonging a middle-gradation region of the luminance histogram). Then, the feature value calculating section 143 calculates a ratio of (a) a total number of pixels each having a luminance greater than the threshold value (i.e. the sum of the frequencies of all the classes belonging to the middle-gradation region or the high-gradation region to (b) all the frequencies of the luminance histogram. Then, the feature value calculating section 143 supplies, to the noise reducing section 150, the ratio as a feature value of the luminance histogram.

Furthermore, the feature value calculating section 143 supplies, to the noise reducing section 150, the average picture level as a feature value of the target decoded image.

(Step 4: Determining whether or not Target Decoded Image Contain a Large Amount of Mosquito Noise)

After the noise reducing section 150 receives the target decoded image from the decoding section 120 and receives the three feature values from the histogram processing section 140, the noise reducing section 150 determines whether or not the target decoded image contains a large amount of mosquito noise.

Specifically, the noise reducing section 150 (i) reads out, from the storage section 130, a threshold value concerning the feature value of the edge histogram and (ii) determines whether or not the feature value of the edge histogram is equal to or greater than the threshold value. In a case where the noise reducing section 150 determines that the feature value is equal to or greater than the threshold value, a number 10 is assigned to a variable Q1. In a case where the noise reducing section 150 determines that the feature value is less than the threshold value, a number 0 is assigned to the variable Q1.

In addition, the noise reducing section 150 (i) reads out, from the storage section 130, a threshold value concerning the feature value of the luminance histogram and (ii) determines whether or not the feature value of the luminance histogram is equal to or greater than the threshold value. In a case where the noise reducing section 150 determines that the feature value is equal to or greater than the threshold value, a number 10 is assigned to a variable Q2. In a case where the noise reducing section 150 determines that the feature value is less than the threshold value, a number 0 is assigned to the variable Q2.

Furthermore, the noise reducing section 150 (i) reads out, from the storage section 130, a threshold value concerning the average picture level and (ii) determines whether or not a feature value indicative of the average picture level supplied from the histogram processing section 140 is equal to or greater than the threshold value. In a case where the noise reducing section 150 determines that the feature value is equal to or greater than the threshold value, a number 10 is assigned to a variable Q3. In a case where the noise reducing section 150 determines that the feature value is less than the threshold value, a number 0 is assigned to the variable Q3.

Finally, it is determined whether or not a value Q obtained from the following Formula 1 is equal to or greater than 50. In a case where the value Q is determined to be equal to or greater than 50, the operation proceeds to a step 5. In a case where the value Q is determined to be less than 50, the operation proceeds to a step 6.

$$Q=Q1\times 5+Q2\times 3+Q3\times 2 \quad \text{(Formula 1)}$$

Note that the numbers 5, 3, and 2 in the Formula 1, which are each a weight value, can be assigned any value. In addition, the number 50, which is the threshold value, can be changed to any other value. Furthermore, a value, which the noise reducing section 150 assigns to each of the variables Q1 through Q3, is not limited to 0 or 10. That is, any value $q_1$ or $q_1'$ can be assigned to the variable Q1, provided that the following is satisfied: The value $q_1$ to be assigned to the variable Q1 in a case where the feature value of the edge histogram is determined to be equal to or greater than the corresponding threshold value is greater than the value $q_1'$ to be assigned to the variable Q1 in a case where the feature value of the edge histogram is determined to be less than the threshold value. The same principle also applies to the variables Q2 and Q3.

(Step 5: Setting Intensity of Noise Reduction Process)

The noise reducing section 150 sets intensity of the noise reduction process to a high level, and the operation proceeds to a step 7.

(Step 6: Setting Intensity of Noise Reduction Process)

The noise reducing section 150 sets intensity of the noise reduction process to a low level, and the operation proceeds to the step 7.

(Step 7: Noise Reduction Process)

The noise reducing section 150 performs a noise reduction process on the target decoded image with intensity set in the previous step, so that the target decoded image contains less mosquito noise. Then, the noise reducing section 150 supplies the target decoded image to a device outside of the video processing device 100. Then, the operation ends.

Note that the video processing device 100 carries out the above operation such that each of decoded images decoded from a video signal serves as a target decoded image.

(Advantages of Video Processing Device 100)

According to the video processing device 100, the edge histogram generating section 141 thus generates, as an edge histogram, a histogram concerning how large luminance differences are between (i) all the pixels constituting a target decoded image and (ii) their respective adjacent pixels.

In a case where it is determined that the target decoded image is to be subjected to a smoothing process, the noise reducing section 150 subjects the target decoded image to the smoothing process.

Specifically, with regard to the edge histogram generated by the edge histogram generating section 141, the noise reducing section 150 determines whether or not a ratio of the sum of frequencies of classes higher than a predetermined class to the sum of all frequencies of all classes is equal to or greater than a predetermined threshold value. Then, the noise reducing section 150 adjusts intensity of a noise reduction process based on whether or not the ratio is equal to or greater than the predetermined threshold value. Then, the noise reducing section 150 performs a smoothing process on the target decoded image with intensity thus adjusted.

According to the configuration, the video processing device 100 performs a high-intensity smoothing process on a large number of target decoded images each containing a large number of pixels (i.e. pixels at edges) each of which has a luminance that is quite different from that of its adjacent pixel. This allows the video processing device 100 to reduce mosquito noise contained in the target decoded images.

According to the configuration, the video processing device 100 also performs a low-intensity smoothing process on a large number of target decoded images each containing a small number of edges. This allows the video processing device 100 to reduce, by more than does a conventional video processing device, a rate of occurrence at which the quality of a target decoded image deteriorates (specifically, at which an adverse effect of causing a blur of the target decoded image stands out more than an effect of reducing mosquito noise).

Therefore, the video processing device 100 is capable of performing an effective smoothing process on an image(s) in accordance with to features of the image.

Note that the video processing device 100 may perform a smoothing process on a target decoded image even in a case where, with regard to the edge histogram generated by the edge histogram generating section 141, the ratio of the sum of the frequencies of classes higher than a predetermined class to the sum of the frequencies of all the classes is less than the predetermined threshold value.

For example, in a case where the feature value of the luminance histogram and the feature value indicative of the average picture level are each equal to or greater than the corresponding threshold value, the video processing device 100 performs a high-intensity smoothing process on the target decoded image. That is, in a case where the target decoded image is an image whose overall brightness is remarkably high, the video processing device 100 performs a high-intensity smoothing process on the target decoded image, regardless of how much mosquito noise there is. In other words, even in a case where the target decoded image does not contain very much mosquito noise, the video processing device 100 performs a high-intensity smoothing process on the target decoded image if, due to the noticeability of the mosquito noise, an effect of reducing the mosquito noise outweighs an adverse effect of the smoothing process.

Therefore, the video processing device 100 brings about an effect of improving the quality of a target decoded image that contains a moderate amount of mosquito noise that is still noticeable.

Embodiment 2

The following description will discuss a video processing device in accordance with another embodiment of the present invention. The video processing device of Embodiment 2 is also equipped with a function to reduce mosquito noise in a video (moving image) based on a video signal that has been inputted. Note, however, that the video processing device of Embodiment 2 differs from the video processing device 100 of Embodiment 1 in that the video processing device of Embodiment 2 is configured to determine, based only on an edge histogram of a target decoded image, whether the target decoded image (each decoded image) obtained by decoding a video signal is to be subjected to a high-intensity noise reduction process or to a low-intensity noise reduction process.

The details of the video processing device of Embodiment 2 will be described below with reference to the drawings.

Figure 5:
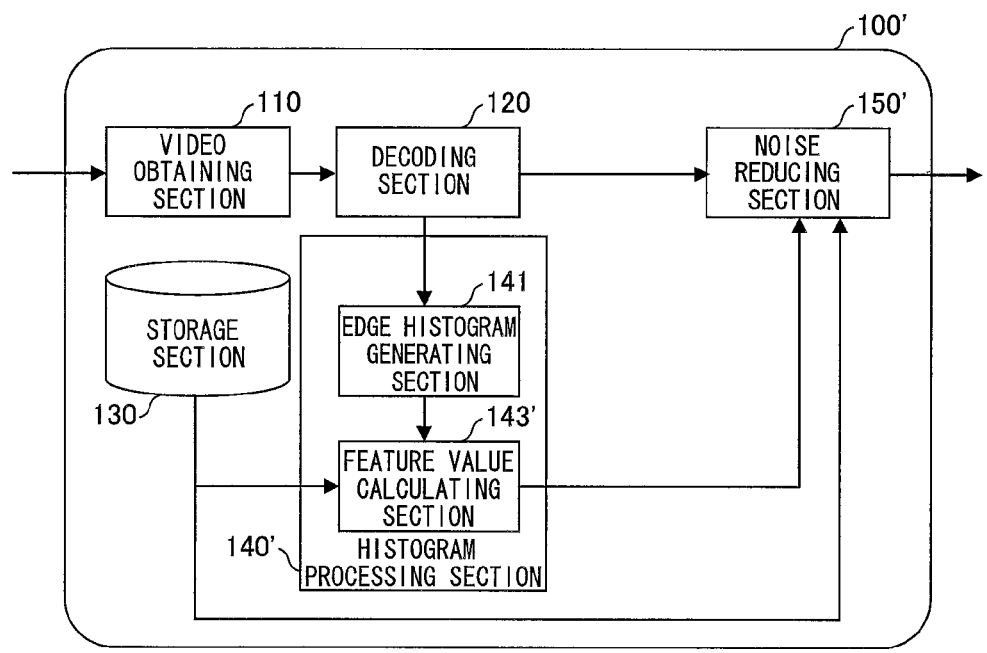
FIG. 5 is a block diagram illustrating a main configuration of a video processing device in accordance with another embodiment of the present invention.

First, a configuration of the video processing device will be described with reference to FIG. 5. FIG. 5 is a block diagram illustrating a main configuration of a video processing device 100' of Embodiment 2. As illustrated in FIG. 5, the video processing device 100' includes a video obtaining section 110, a decoding section 120, a storage section 130, a histogram processing section 140', and a noise reducing section 150'.

Since the video obtaining section 110, the decoding section 120, and the storage section 130 were described in Embodiment 1, their description will be omitted in Embodiment 2. The histogram processing section 140' and the noise reducing section 150' will be described below.

(Histogram Processing Section 140')

The histogram processing section 140' includes an edge histogram generating section 141 and a feature value calculating section 143'. Since the edge histogram generating section 141 was described in Embodiment 1, its description will be omitted. The feature value calculating section 143' will be described below.

Based on an edge histogram generated by the edge histogram generating section 141 and on a threshold value stored in the storage section 130, the feature value calculating section 143' calculates a feature value (feature value of the edge histogram) concerning a target decoded image.

(Noise Reducing Section 150')

The noise reducing section 150' determines whether or not the feature value of the edge histogram supplied from the histogram processing section 140' is equal to or greater than the threshold value stored in the storage section 130.

In a case where the feature value is equal to or greater than the threshold value, the noise reducing section 150' determines that a high-intensity noise reduction process is to be performed on the target decoded image. In a case where the feature value is equal to or greater than the threshold value, the noise reducing section 150' determines that a low-intensity noise reduction process is to be performed on the target decoded image.

In a case where it is determined that a noise reduction process is to be performed on the target decoded image, the noise reducing section 150' supplies, to a device outside of the video processing device 100', a target decoded image that has been subjected to the noise reduction process. In a case where it is determined that the noise reduction process is not to be performed on the target decoded image, the noise reducing section 150' supplies, to the device outside of the video processing device 100', the target decoded image as supplied from the decoding section 120.

(Advantages of Video Processing Device 100')

According to the video processing device 100', the edge histogram generating section 141 thus generates, as an edge histogram, a histogram concerning how large luminance differences are between (i) all the pixels constituting a target decoded image and (ii) their respective adjacent pixels.

With regard to the edge histogram generated by the edge histogram generating section 141, the noise reducing section 150' determines whether or not a ratio of the sum of frequencies of classes higher than a predetermined class to the sum of all frequencies of all classes is equal to or greater than a predetermined threshold value. In a case where the ratio is determined to be equal to or greater than the predetermined threshold value, the target decoded image is then subjected to high-smoothing-intensity smoothing process. In a case where the ratio is determined to be less than the predetermined threshold value, the target decoded image is then subjected to a low-smoothing intensity smoothing process.

According to the configuration, the video processing device 100' performs a high-intensity smoothing process on all of target decoded images each containing a large number of pixels (i.e. pixels at edges) whose luminances are quite different from those of their respective adjacent pixels. This allows the video processing device 100' to reduce mosquito noise contained in the target decoded images.

According to the configuration, the video processing device 100' also performs only a low-intensity smoothing process on target decoded images each containing a small number of edges. This allows the video processing device 100' to attain, in comparison with a conventional video processing device, a lower rate of occurrence at which the image process ends up causing deterioration of the quality of the target decoded image.

Therefore, the video processing device 100' brings about an effect of making it possible to perform an effective smoothing process on a target decoded image(s) in accordance with to features of the image.

Furthermore, the video processing device 100' has such an advantage as being able to bring about the foregoing effect with a simpler process than is the case of the video processing device 100 of Embodiment 1.

Embodiment 3

The following description will discuss a video processing device in accordance with a further embodiment of the present invention. The video processing device of Embodiment 3 is also equipped with a function to reduce mosquito noise in a video (moving image) based on a video signal that has been inputted. Note, however, that the video processing device of Embodiment 3 differs from the video processing devices of Embodiments 1 and 2 in that an intensity of a noise reduction process to be carried out on a decoded image is adjusted in accordance with a factor other than a histogram.

The details of the video processing device of Embodiment 3 will be described below with reference to the drawings.

Figure 6:
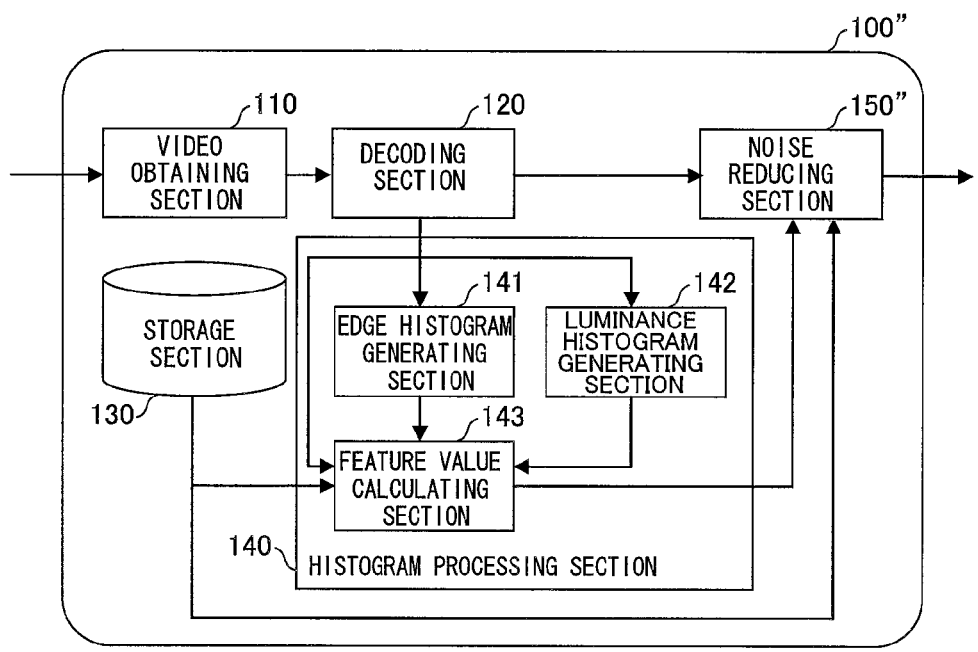
FIG. 6 is a block diagram illustrating a main configuration of a video processing device in accordance with a further embodiment of the present invention.

First, a configuration of the video processing device will be described below with reference to FIG. 6. FIG. 6 is a block diagram illustrating a main configuration of a video processing device 100" in accordance with Embodiment 3. As illustrated in FIG. 6, the video processing device 100" includes a video obtaining section 110, a decoding section 120, a storage section 130, a histogram processing section 140, a noise reducing section 150", and a display section 160.

Since the video obtaining section 110, the decoding section 120, the storage section 130, and the histogram processing section 140 were described in Embodiment 1, their description will be omitted in Embodiment 3. The noise reducing section 150" and the display section 160 will be described below.

(Display Section 160)

The display section 160 is a display that displays an image.

(Noise Reducing Section 150")

By employing a method similar to that employed by the noise reducing section 150 (i.e. based on results concerning three feature values), the noise reducing section 150" calculates a provisional value indicative of an intensity of a noise reduction process to be performed on a target decoded image supplied from the decoding section 120.

In addition, the noise reducing section 150" determines resolution (i.e. the number of pixels per column×the number of pixels per row) of target decoded image data by referring to metadata of the target decoded image data.

In a case where the resolution of the target decoded image data is equal to or greater than predetermined resolution (e.g. HD resolution), the noise reducing section 150" (sub-adjusting means) performs a noise reduction process on the target decoded image data with an intensity lower than that indicated by the provisional value. On the other hand, in a case where the resolution of the target decoded image data is less than the predetermined resolution (e.g. in a case where the target decoded image data is SD-resolution image data), the noise reducing section 150" performs a noise reduction process on the target decoded image with an intensity higher than that indicated by the provisional value.

Then, the noise reducing section 150" causes the display section 160 to display a target decoded image based on the target decoded image data which has been subjected to the noise reduction process.

In a case where the video processing device 100" is realized as a full HD television, the predetermined resolution is preferably set to full HD resolution. In a case where the video processing device 100" is realized as a 4K2K television, the predetermined resolution is preferably set to 4K2K resolution. In other words, the video processing device 100" is preferably configured such that decoded image data having a resolution less than a screen resolution of the display section 160 is subjected to a noise reduction process with an intensity higher than that of a noise reduction process performed on decoded image data having a resolution equal to or greater than the screen resolution of the display section 160.

As an alternative, the video processing device 100" can also be configured to determine whether or not a decoded image is an image that has been upscaled. The video processing device 100" thus configured preferably performs a noise reduction process on decoded image data with an intensity higher than that indicated by the provisional value in a case where it is determined that the decoded image data is image data obtained by upscaling even if the decoded image data has a resolution equal to or greater than a predetermined resolution. This is because noise on an image that has been upscaled is noticeable.

(Advantages of Video Processing Device 100")

The video processing device 100" thus configured performs a low-intensity noise reduction process on a high-resolution image whose details are easily ruined by a high-intensity noise reduction process. In addition, the video processing device 100" performs a high-intensity noise reduction process on a low-resolution image containing mosquito noise that becomes noticeable in a case of upscaling.

Therefore, the video processing device 100" is capable of outputting a high-quality image by realizing an excellent balance between reducing of mosquito noise and securing of picture details.

(Additional Remark 1 of Embodiment 3)

In a case where, for example, the video processing device 100" is realized as a digital television, the noise reducing section 150" can be configured as described below.

By referring to metadata of a target decoded image, the noise reducing section 150" can determine a genre of content of a moving image instead of determining resolution of the target decoded image.

Additionally, based on the genre thus determined, the noise reducing section 150" can adjust an intensity of a noise reduction process to be performed on each of decoded images (image frames) constituting the moving image.

Specifically, in a case where the genre of content of a moving image is movie, the noise reducing section 150" can (i) cause an intensity of a noise reduction process, which is to be performed on a target decoded image, to be significantly low or (ii) avoid performing a noise reduction process on the target decoded image at all. This is because noise in a video of a movie stored in a package media is less noticeable than noise in a video of a general program, due to a difference in compression format.

In a case where the genre of content of a moving image is sports, the noise reducing section 150" (sub-adjusting means) can adjust the intensity of the noise reduction process in accordance with a type of sport. For example, in a case where the content of the moving image involves a particular type of competition in which competitors actively move (such as marathon or race walking), it is possible to perform a noise reduction process on the target decoded image with an intensity higher than that indicated by a provisional value obtained from the target decoded image. In a case where the content of the moving image is any type of competition other than the particular type of competition (such as sumo wrestling), it is possible to perform a noise reduction process on the target decoded image with an intensity lower than that indicated by the provisional value.

Note that the video processing device 100" can be configured such that a user can register, via an operating section (not illustrated), any type of competition as the particular type of competition. In the case where the genre of the content of the moving image is sports, the video processing device 100" can also determine, in accordance with a title (name) of the content, whether or not the content of the moving image involves the particular type of competition.

In a case where the genre of content of a moving image is entertainment, the noise reducing section 150" can perform a noise reduction process on a target decoded image with an intensity higher than that indicated by a provisional value. This is because a video of an entertainment program contains many ticker/banners and therefore noise is noticeable.

In a case where the genre of content of a moving image is documentary, the noise reducing section 150" can also perform a noise reduction process on a target decoded image with an intensity higher than that indicated by a provisional value. This is because a documentary program, which is filmed in an outdoor location in many cases, tends to have a large number of scenes with high average brightness, and therefore noise in a video of the documentary program is noticeable.

By referring to metadata of a target decoded image, the noise reducing section 150" can both (i) determine resolution of the target decoded image and (ii) determine the genre of content of a moving image. In such a case, the noise reducing section 150" can determine an intensity of a noise reduction process to be performed on the decoded image, based on both the resolution of the target decoded image and the genre of the content of the moving image.

(Additional Remark 2 of Embodiment 3)

For example, in a case where the video processing device 100" is realized as a digital television, the noise reducing section 150" can be configured as described below:

The noise reducing section 150" can adjust an intensity of a noise reduction process to be performed on a target decoded image, in accordance with a current image quality mode (AV mode) of the video processing device 100".

Specifically, in a case where the AV mode is set to a movie mode, the noise reducing section 150" can either cause the intensity of the noise reduction process to be significantly low or avoid performing the noise reduction process on the target decoded image at all. This is because the movie mode is a mode in which contrast of a picture is to be more clearly perceived than gradation of the picture, and therefore the avoidance of the noise reduction process allows a more proper image to be obtained.

In a case where the AV mode is set to a standard mode, the noise reducing section 150" (sub-adjusting means) can perform a noise reduction process on a target decoded image with an intensity a little higher than that indicated by a provisional value. This is because of the following reasoning: A video viewed with the AV mode set to the standard mode is assumed to be a video that is being broadcast in many cases, and a broadcast video uses a large number of tickers/banners which tends to cause noise in the video.

In a case where the AV mode is a dynamic mode, the noise reducing section 150" can perform a noise reduction process on a target decoded image with an intensity significantly higher than that indicated by a provisional value. This is because of the following reasoning: The dynamic mode is a mode in which a video is processed to become bright, vivid, and clear. In order to reduce noise that easily stands out after such image processing, it is preferable to perform a noise reduction process on the target decoded image with a significantly high intensity.

(Additional Remark 3 of Embodiment 3)

The video processing device 100" does not need to include the storage section 130 or the histogram processing section 140. In such a case, the noise reducing section 150" can determine the intensity of the noise reduction process in accordance with only one or more of three types of factors which are resolution of content of a moving image, a genre of the content of the moving image, and a current image quality mode of the video processing device 100".

For example, the video processing device 100" can determine the intensity of the noise reduction process in accordance with only the resolution of the content of the moving image. Specifically, in a case where the resolution of the decoded image is lower than a predetermined resolution, it is possible, regardless of a luminance histogram or an edge histogram of the decoded image data, to carry out a noise reduction process with an intensity higher than that of the noise reduction process to be carried out in a case where the resolution of the decoded image data is equal to or greater than the predetermined resolution.

As an alternative, the video processing device 100" can determine the intensity of the noise reduction process in accordance with, for example, only the genre of the content of the moving image. Specifically, regardless of the luminance histogram or the edge histogram of the decoded image, the video processing device 100" can determine the intensity of the noise reduction process in accordance with the following conditions (1) through (3):

(1) The intensity of the noise reduction process is set to a significantly low level in a case where the genre is movie.
(2) The intensity of the noise reduction process is set to a high level in a case where the genre is sports and where the content of the moving image involves the particular type of competition whereas the intensity of the noise reduction process is set to a low level in a case where the genre is sports and where the content of the moving image involves any type of competition other than the particular type of competition.
(3) The intensity of the noise reduction process is set to a high level in a case where the genre is entertainment or documentary.

As another alternative, the video processing device 100" can determine the intensity of the noise reduction process in accordance with, for example, only the current image quality mode (AV mode) of the video processing device 100". Specifically, regardless of the luminance histogram or the edge histogram of the decoded image, the video processing device 100" can determine the intensity of the noise reduction process in accordance with the following conditions (4) through (6):

(4) The intensity of the noise reduction process is set to a significantly low level in a case where the AV mode is set to the movie mode.
(5) The intensity of the noise reduction process is set to a somewhat high level in a case where the AV mode is set to the standard mode.
(6) The intensity of the noise reduction process is set to a significantly high level in a case where the AV mode is set to the dynamic mode.

(Other Additional Remarks)

(Additional Remark 1)

The present invention is not limited to the video processing devices 100, 100', and 100". For example, the present invention can be realized as a television receiver which includes: a video obtaining section 110, a decoding section 120; a storage section 130; a histogram processing section 140 (140'); a noise reducing section 150 (150'); and a display section (not illustrated), the decoding section 120 being configured to carry out decoding of a TS (Transport Stream) received as a broadcast signal, and the display section being configured to display a video obtained by the decoding.

(Additional Remark 2)

The present invention can be realized not only as a device for processing a video (moving image) such as the video processing devices 100 and 100' described above, but also as a device for processing a still image.

(Additional Remark 3)

According to Embodiment 1, the noise reducing section 150 (i) calculates three feature values which are a feature value of an edge histogram, a feature value of a luminance histogram, and a feature value of an average picture level and (ii) determines, based on the three feature values thus calculated, whether a target decoded image is to be subjected to a high-intensity smoothing process or to a low-intensity smoothing process. According to Embodiment 2, the noise reducing section 150' determines, based only on a feature value of an edge histogram, whether a target decoded image is to be subjected to a high-intensity smoothing process or to a low-intensity smoothing process.

The present invention is not limited to these configurations. It is possible that (i) a histogram processing section calculates two feature values which are a feature value of an edge histogram and a feature value of a luminance histogram and (ii) a noise reducing section determines, based on the two feature values thus calculated, whether a target decoded image is to be subjected to a high-intensity smoothing process or to a low-intensity smoothing process.

As an alternative, it is also possible that (i) a histogram processing section calculates two feature values which are a feature value of an edge histogram and a feature value of an average picture level and (ii) a noise reducing section determines, based on the two feature values thus calculated, whether a target decoded image is to be subjected to a high-intensity smoothing process or to a low-intensity smoothing process.

(Additional Remark 4)

The noise reduction process described above can be mainly classified into:

3D noise reduction process 2D noise reduction process.

A noise reduction process is carried out by referring to a target frame and to one or more other frames.

Specifically, the 3D noise reduction process is a process in which an image after a noise reduction is generated by working out an average, for each pixel, of (i) a target region during a target frame and (ii) a target region during one or more reference frames before and/or after the target frame timewise.

Note that in a case where a 3D noise reduction process with a greater intensity is carried out, the noise reducing section causes the number of reference frames to be large. In a case where a 3D noise reduction process with a less intensity is carried out, the noise reducing section causes the number of reference frames to be small.

Note also that the above-described averaging process in the 3D noise reduction process may employ a weighting factor that is set so that an image after the noise reduction has high image quality.

On the other hand, a 2D noise reduction process is carried out by referring to (i) a target pixel during a target frame and (ii) reference pixels within a reference region set to surround the target pixel during the target frame.

Specifically, the 2D noise reduction process is a process in which an image after a noise reduction is generated by working out an average of (i) a pixel value of a target pixel during a target frame and (ii) pixel values of reference pixels within a reference region set to surround the target pixel during the target frame.

Note that in a case where a 2D noise reduction process with a greater intensity is carried out, the noise reducing section sets the reference region to be large. In a case where a 2D noise reduction process with a less intensity is carried out, the noise reducing section sets the reference region to be small.

Note also that the above-described averaging process in the 2D noise reduction process may employ a weighting factor that is set so that an image after the noise reduction has high image quality.

[Summary]

In order to attain the object, an image processing device (video processing device 100') in accordance with Aspect 1 of the present invention includes: first generating means (edge histogram generating section 141) for generating, as first frequency distribution data (edge histogram), frequency distribution data concerning how large luminance differences are between (i) pixels constituting an image and (ii) their respective adjacent pixels; first determining means (noise reducing section 150') for determining whether or not a first ratio of a sum of frequencies of classes higher than a predetermined class of the first frequency distribution data to a sum of all frequencies of the first frequency distribution data is equal to or greater than a first predetermined threshold value; smoothing means (noise reducing section 150') for performing a smoothing process on the image; and adjusting means (noise reducing section 150') for adjusting a smoothing intensity of the smoothing process in accordance with whether or not the first determining means determines that the first ratio is equal to or greater than the first predetermined threshold value, the smoothing means being configured to perform the smoothing process on the image with the smoothing intensity that has been adjusted by the adjusting means.

According to the configuration, the image processing device of the present invention operates such that (i) a high-intensity smoothing process is normally carried out on an image including a large amount of pixels (i.e. edge part) whose luminances are quite different from those of their respective adjacent pixels (i.e. an image for which the first determining means determines that the ratio is equal to or greater than the predetermined threshold value) and (ii) a low-intensity smoothing process is normally carried out on an image including a small amount of the pixels (i.e. edge part) whose luminances are quite different from those of their respective adjacent pixels (i.e. an image for which the first determining means determines that the ratio is less than the predetermined threshold value).

Therefore, the image processing device of the present invention is capable of reducing, by a high-intensity smoothing process, mosquito noise contained in an image including a large amount of edge parts. In addition, the image processing device of the present invention merely carries out a low-intensity smoothing process on an image containing little mosquito noise due to little amount of s edge part. This prevents the quality of the image from deteriorating as a result of an image blur due to a smoothing process.

Therefore, with the image processing device of the present invention, it is possible to perform an effective smoothing process on an image in accordance with the features of the image.

In order to attain the object, an image processing method in accordance with Aspect 10 of the present invention includes the steps of: (a) generating frequency distribution data concerning how large luminance differences are between (i) pixels constituting an image and (ii) their respective adjacent pixels; (b) determining whether or not a ratio of a sum of frequencies of classes higher than a predetermined class of the frequency distribution data to a sum of all frequencies of the frequency distribution data is equal to or greater than a predetermined threshold value; (c) performing a smoothing process on the image; and (d) adjusting a smoothing intensity of the smoothing process in accordance with whether or not it is determined in the step (b) that the ratio is equal to or greater than the predetermined threshold value, in the step (c), a smoothing process being performed on the image with a smoothing intensity that has been adjusted in the step (d).

With the configuration, the image processing method of the present invention produces advantageous effect similar to those produced by the image processing device of the present invention.

The image processing device (video processing device 100) in accordance with Aspect 2 of the present invention is preferably configured in Aspect 1 to further include: second generating means (luminance histogram generating section 142) for generating, as second frequency distribution data (luminance histogram), frequency distribution data concerning levels of luminances of the respective pixels constituting the image are; and second determining means (noise reducing section 150) for determining whether or not a second ratio of a sum of frequencies of classes higher than a predetermined class of the second frequency distribution data to a sum of all frequencies of the second frequency distribution data is equal to or greater than a second predetermined threshold value; the adjusting means (noise reducing section 150) being configured to adjust the smoothing intensity in accordance with whether or not the second determining means determines that the second ratio is equal to or greater than the second predetermined threshold value.

Note that an image containing a large number of pixels of high luminance has a feature that even a moderate amount of mosquito noise tends to be noticeable.

With the configuration, the image processing device of the present invention brings about an additional effect of being able to improve the quality of an image including a large amount of pixels having high luminances (i.e. image determined for which the second determining means determines that the ratio is equal to or greater than the predetermined threshold value).

The image processing device in accordance with Aspect 3 of the present invention is preferably configured in Aspect 1 or 2 to further include: calculating means (feature value calculating section 143) for calculating an average picture level of the image; and third determining means (noise reducing section 150, 150') for determining whether or not the average picture level is equal to or greater than a third predetermined threshold value, the adjusting means being configured to adjust the smoothing intensity in accordance with whether or not the third determining means determines that the average picture level is equal to or greater than the third predetermined threshold value.

Note that an image having a high average picture level has a feature that even a moderate amount of mosquito noise tends to be noticeable.

With the configuration, the image processing device of the present invention brings about an additional effect of being able to improve the quality of an image containing noticeable mosquito noise and having a high average picture level (i.e. image for which the third determining means determines that the average picture level is equal to or greater than the predetermined threshold value).

The image processing device in accordance with Aspect 4 of the present invention is preferably configured in Aspect 1 such that, in a case where the first determining means determines that the first ratio is equal to or greater than the first predetermined threshold value, the adjusting means adjusts the smoothing intensity to a level higher than a level to which the smoothing intensity is adjusted in a case where the first determining means determines that the first ratio is less than the first predetermined threshold value.

The image processing device (video processing device 100") in accordance with Aspect 5 of the present invention is preferably configured in any one of Aspects 1 through 4 such that the adjusting means (noise reducing section 150") includes sub-adjusting means for (i) adjusting the smoothing intensity to a high level in a case where a resolution of image data, on which the image is based, is less than a screen resolution of the display section displaying the image and (ii) adjusting the smoothing intensity to a low level in a case where the resolution of the image data is equal to or greater than the screen resolution of the display section.

According to the configuration, the image processing device carries out a low-intensity smoothing process on an image based on image data having such a high resolution (i.e. resolution equal to or greater than a screen resolution) that an adverse effect of losing the details as a result of a high-intensity smoothing process outweighs an effect of reducing mosquito noise. In addition, the image processing device carries out a high-intensity smoothing process on an image based on image data having such a low resolution (i.e. resolution less than the screen resolution) that the effect of an image equality improvement by the mosquito noise reduction as a result of a high-intensity smoothing process stands out more than the adverse effect of losing the details.

Therefore, the image processing device is capable of performing an effective smoothing process on an image in accordance with the features of the image.

The image processing device (video processing device 100") in accordance with Aspect 6 of the present invention is preferably configured in any one of Aspects 1 through 4 to further include: image quality mode determining means for determining an image quality mode set in the image processing device, the adjusting means including sub-adjusting means for adjusting the smoothing intensity of the smoothing process in accordance with the image quality mode.

The present invention can also be realized as a moving image processing device (moving image processing device in accordance with Aspect 7 of the present invention) which is a moving image processing device (video processing device 100) including each of the means included in the image processing device (the image processing device in accordance with any one of Aspects 1 through 6), the first generating means being configured to generate the first frequency distribution data from each one of image frames constituting a moving image, the first determining means being configured to determine whether or not the first ratio is equal to or greater than the first predetermined threshold value in the first frequency distribution data, the adjusting means being configured to adjust the smoothing intensity of the smoothing process in accordance with whether or not the first determining means determines that the first ratio is equal to or greater than the first predetermined threshold value, and the smoothing means being configured to perform a smoothing process on said each one of the image frames with a smoothing intensity that has been adjusted by the adjusting means.

The moving image processing device (video processing device 100") in accordance with Aspect 8 of the present invention is preferably configured in Aspect 7 to further include: genre determining means (noise reducing section 150") for determining a genre to which content of the moving image belongs, the adjusting means including sub-adjusting means (noise reducing section 150") for adjusting the smoothing intensity of the smoothing process in accordance with the genre thus determined.

The moving image processing device in accordance with Aspect 9 of the present invention can also be realized as a television receiver including each of the means included in the moving image processing device (moving image processing device in accordance with Aspect 7 or 8).

The scope of the present invention also encompasses (i) a program for causing a computer to serve as each of the means included in the image processing device (image processing device in accordance with any one of Aspects 1 through 6 or moving image processing device in accordance with Aspect 7 or 8) and (ii) a computer-readable storage medium in which the program is stored.

DESCRIPTION OF INVENTION RELATIVE TO PRESENT INVENTION

The following description will discuss an invention relative to the present invention (the invention will be referred to as "present invention" in the description).

[Title of Invention]
VIDEO PROCESSING DEVICE, VIDEO PROCESSING METHOD, TELEVISION RECEIVER, PROGRAM, AND STORAGE MEDIUM

[Technical Field]
The present invention mainly relates to a video processing device and a video processing method which improve the quality of a video.

[Background Art]
In order to improve the quality of a video, there have conventionally been various technologies developed.

For example, Patent Literature A discloses a display device intended to improve image quality by enhancing not only grayscale contrast but also color contrast and movement contrast in accordance with features of a video. The display device of Patent Literature 1 first (i) obtains the features of the video from respective histograms of luminance, color, edge, and movement and (ii) determines proper filters and proper filter parameters based on a database of histogram patterns and of filter parameters which are effective for the histogram patterns. Then, in accordance with the histogram patterns and the filter parameters thus determined, the display device selects a difference enhancement filter, a contrast correction filter, a luminance amplification filter, and a color difference conversion filter. Then, the display device sets filter parameters, and then carries out data processing in accordance with the filter parameters. Then, the display device, for example, supplies video data to a liquid crystal panel.

There has also been a technology developed for reducing noise that occurs in the process of decoding a compression-encoded video.

In recent years, for example, video data is compression-encoded in an MPEG (Moving Picture Experts Group)-2 method, an MPEG-4 method, or the like, and then transmitted, broadcast, or stored. According to these methods, (i) an image is divided into blocks, (ii) each of the blocks is subjected to 2D DCT (discrete cosine transform), (iii) a value (conversion coefficient) obtained by the 2D DCT is quantized, and (iv) each conversion coefficient after the quantization is encoded.

Therefore, in a case where the quantization of the conversion coefficient is rough, adjacent blocks differ in quantization level when the video is decoded. The difference in level causes the continuity of luminance value or the like to be lost at a boundary between the adjacent blocks. As a result, block-formed encoding noise becomes displayed. This encoding noise is called "block noise"

In a case where there is a drastic luminance variance such as a case of an edge or the like in an image, a large number of high-frequency components are then generated. In so doing, if a conversion coefficient of a high-frequency region is regarded as 0 because the quantization is rough, then components in the high-frequency region, of all the conversion coefficients, become insufficient when the video is decoded. This causes wavy encoding noise to be displayed. This encoding noise appears as flying mosquitoes, and is therefore called "mosquito noise."

The block noise and the mosquito noise occur because of compressibility and content of a video. For example, a video showing movements, such as a video of multiple leaves rustling or a video of waves of the ocean, have high compressibility. This causes block noise to be observable in the video, and therefore causes display quality of the video to deteriorate.

[Citation List]
[Patent Literature]
[Patent Literature A]
Japanese Patent Application Publication, Tokukai, No. 2004-198479 (Publication Date: Jul. 15, 2004)

[Summary of Invention]
[Technical Problem]
Block noise can be reduced by carrying out smoothing (averaging) to cause a boundary part between adjacent blocks to be less noticeable. However, the following problem arises: although intensification of smoothing for reducing the block noise suppresses deterioration of display quality of a video in which block noise is noticeable, the intensification of smoothing results in blurring of a video in which block noise is unnoticeable, and therefore causes a reduction in display quality of the video.

The present invention has been made in view of the problem, and it is an object of the present invention to provide a video processing device and the like capable of determining whether or not a video contains noticeable block noise.

[Solution to Problem]
Block noise tends to be noticeable in a video in which a subject moves and a large number of parts of the subject move. Examples of such a video encompass a video of a marathon, a video of a horse race, and a video captured in a studio.

Therefore, in order to attain the object, a video processing device in accordance with one aspect of the present invention is a video processing device for reducing block noise in an image obtained by decoding a video signal, said video processing device, including: frequency distribution calculating means for calculating a luminance frequency distribution in the image; variance calculating means for calculating an inter-frame variance in the luminance frequency distribution calculated by the frequency distribution calculating means; difference calculating means for calculating an inter-frame luminance difference of each of pixels of the image; pixel count calculating means for calculating the number of pixels whose inter-frame luminance differences calculated by the difference calculating means are each equal to or greater than a difference predetermined value; and noise reducing means for performing a block noise reduction on the image in a case where (i) the inter-frame variance calculated by the variance calculating means is equal to or less than a variance predetermined value and (ii) the number of pixels calculated by the pixel count calculating means is equal to or greater than a pixel-count predetermined value.

In order to attain the object, a video processing method in accordance with another aspect of the present invention is a video processing method for reducing block noise in an image obtained by decoding a video signal, including the steps of: (a) calculating a luminance frequency distribution in the image; (b) calculating an inter-frame variance in the luminance frequency distribution calculated in the step (a); (c) calculating an inter-frame luminance difference of each of pixels of the image; (d) calculating the number of pixels whose inter-frame luminance differences calculated in the step (c) are each equal to or greater than a difference predetermined value; and (e) performing a block noise reduction on the image in a case where (i) the inter-frame variance calculated in the step (b) is equal to or less than a variance predetermined value and (ii) the number of pixels calculated in the step (d) is equal to or greater than a pixel-count predetermined value.

[Advantageous Effects of Invention]

One aspect and another aspect of the present invention bring about the following advantageous effect: In a case of a video in which an inter-frame variance in luminance frequency distribution is equal to or less than its predetermined value and which includes equal to or greater than a predetermined number of pixels whose inter-frame luminance differences are each equal to or greater than its predetermined value, the video is regarded as a video in which a subject(s) moves and a large number of parts of the subject(s) move (a video in which block noise is noticeable), and is therefore subjected to a block noise reduction. By this configuration, it is possible to properly determine whether or not a video contains noticeable block noise.

[Description of Embodiments]

Embodiment 4

A video processing device in accordance with an embodiment of the present invention is a device equipped with a function (noise reduction (NR) function) to reduce block noise in an image which is obtained by decoding an inputted video signal. Specifically, the video processing device of Embodiment 4 is configured to (i) individually evaluate whether or not decoded images obtained by decoding a video signal are images in which block noise is noticeable and (ii) reduce the block noise in accordance with results of the evaluation.

The following description will discuss, with reference to the drawings, the details of the video processing device of Embodiment 4.

Figure 7:
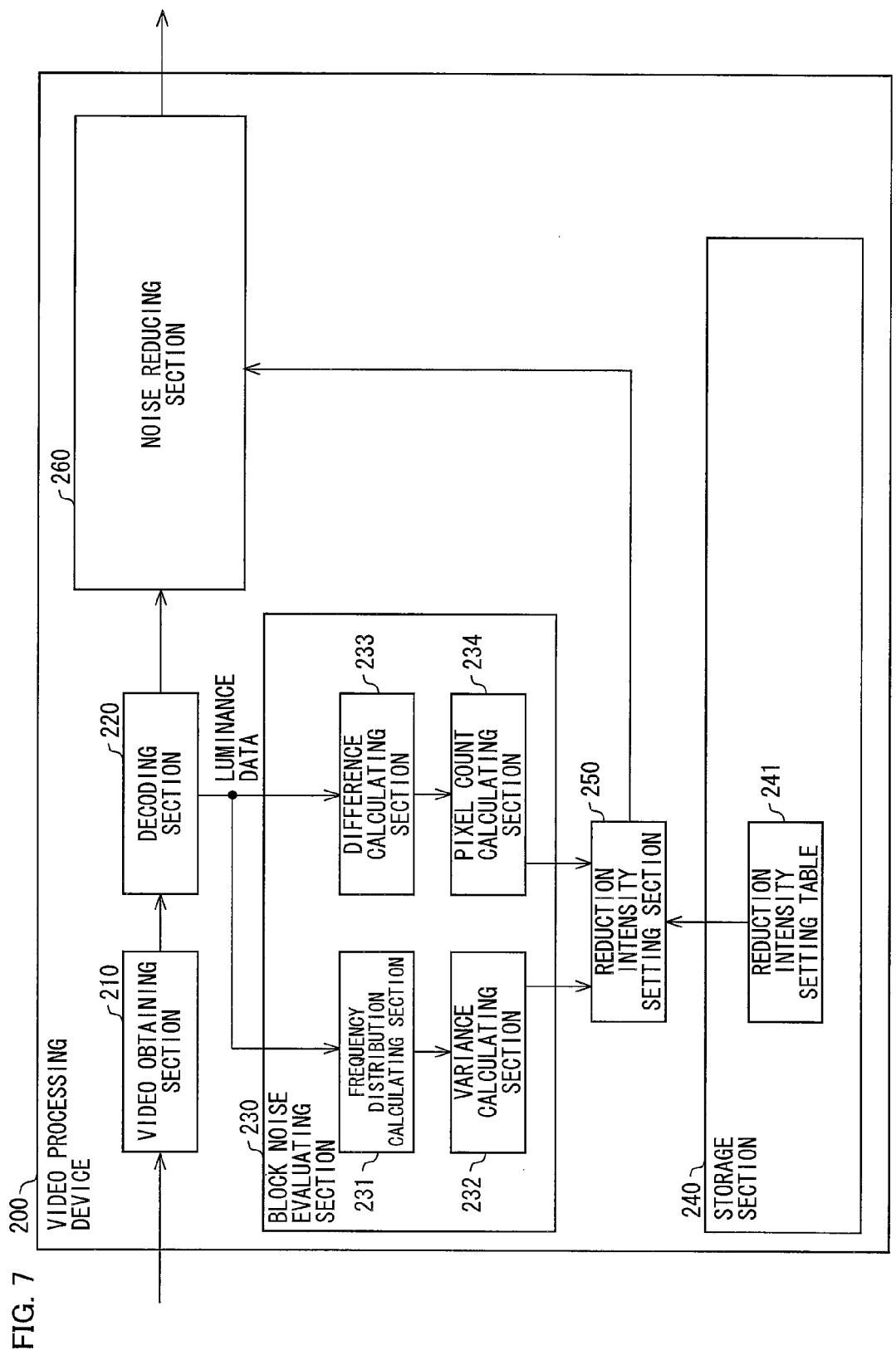
FIG. 7 is a block diagram illustrating a main configuration of a video processing device in accordance with one embodiment of the invention related to the present invention.

First, a configuration of the video processing device will be described below with reference to FIG. 7 is a block diagram illustrating a main configuration of a video processing device 200 in accordance with Embodiment 4. As illustrated in FIG. 7, the video processing device 200 includes a video obtaining section 210, a decoding section 220, a block noise evaluating section 230, a storage section 240, a reduction intensity setting section (intensity setting means) 250, and a noise reducing section (noise reducing means) 260.

(Video Obtaining Section 210)

The video obtaining section 210 receives a video signal which has been converted from a video. Then, the video obtaining section 210 supplies the video signal to the decoding section 220. Examples of a source from which to receive the video signal encompass any form of video signal sources such as a broadcast wave and video data which is stored in a storage medium.

(Decoding Section 220)

The decoding section 220 decodes the video signal supplied from the video obtaining section 210. The video signal to be decoded by the decoding section 220 is compression-encoded with the use of, for example, MPEG-1, MPEG-2, H.264/MPEG-4.AVC (Advanced Video Coding), or the like.

The decoding section 220 generates decoded images from the video signal, one after another. The decoding section 220 (i) supplies, to the noise reducing section 260, a decoded image thus generated and (ii) supplies, to the block noise evaluating section 230, luminance data of the decoded image. Note that the decoding section 220 can supply, to the block noise evaluating section 230, R (red) G (green) B (blue) data of the decoded image in addition to or instead of the luminance data.

Specifically, the decoding section 220 generates the decoded image by (i) generating a prediction image either by in-screen prediction (intra prediction) or by inter-screen prediction (inter prediction) and then (ii) adding, to pixel values of the prediction image, corresponding pixel values obtained by decoding the video signal.

In a case where the prediction image is to be generated by inter prediction, the decoding section 220 generates the prediction image by (i) referring to a decoded image(s) which is/are already decoded and stored in a frame memory (not illustrated) and (ii) subjecting, to motion compensation employing motion vectors, each of blocks constituting the decoded image. Note that the motion vector information indicating the motion vectors is decoded from the video signal.

Normally, a video signal contains a quantization conversion coefficient (also simply referred to as "conversion coefficient") obtained by (i) performing a frequency conversion (e.g. DCT conversion) of pixel values of pixels included in each block and then (ii) carrying out a quantization process in accordance with a quantization parameter. For example, in a case of a video signal encoded in blocks of 8×8 pixels, the video signal contains, in each block thereof, a quantization conversion coefficient of 8×8 components.

In a case where such a video signal is to be decoded, the decoding section 220 decodes each pixel value by (i) subjecting each conversion coefficient to inverse quantization by referring to quantization parameters and then (ii) carrying out an inverse frequency conversion.

Frames (pictures) contained in the video signal are mainly classified as follows:

I pictures: Pictures that can be decoded without reference made to any other pictures. I pictures are, for example, images that have been encoded by use of the intra prediction.

P pictures: Pictures that can be decoded with reference made to another picture. P pictures are, for example, images that have been encoded by use of the inter prediction.

B pictures: Pictures that can be decoded with reference to two other pictures. B pictures are, for example, images that have been encoded by use of the inter prediction.

(Block Noise Evaluating Section 230)

The block noise evaluating section 230 evaluates, by use of the luminance data of the decoded image supplied from the decoding section 220, a quantity of block noise contained in a decoded image (target decoded image) which is to be subjected to a noise reduction process. The block noise evaluating section 230 supplies evaluation results to the reduction intensity setting section 250. The details of the block noise evaluating section 230 will be described later.

(Storage Section 240)

The storage section 240 stores a reduction intensity setting table 241 for setting an intensity of a noise reduction process to be performed on the target decoded image. The storage section 240 can be configured by use of a storage device such as an HDD (Hard Disk Drive). The details of the reduction intensity setting table 241 will be described later.

(Reduction Intensity Setting Section 250)

The reduction intensity setting section 250 sets, by referring to the reduction intensity setting table 241 of the storage section 240, an intensity of the noise reduction process, which intensity corresponds to the evaluation results of the block noise evaluating section 230.

The reduction intensity setting section 250 supplies, to the noise reducing section 260, information on the intensity thus set.

(Noise Reducing Section 260)

The noise reducing section 260 performs a noise reduction process on the target decoded image with the intensity set by the reduction intensity setting section 250, which noise reduction process reduces the block noise of the target decoded image. Then, The noise reducing section 260 supplies, to a device outside of the video processing device 200, the target decoded image that has been subjected to the noise reduction process.

Next, the details of the block noise evaluating section 230 and of the reduction intensity setting table 241 will be describe below.

(Decoded Image that Easily Deteriorates Due to Block Noise)

Video quality of videos such as those described below is likely to have deteriorated due to block noise that is observable and noticeable.

Video quality of videos such as those described below is likely to have deteriorated due to block noise that is observable (noticeable).

(1) Videos, such as a video of many leaves of trees that are rustling in the wind, in which a subject (many leaves) including a large amount of high-frequency components of luminance is moving.
(2) Videos, such as a video of a marathon captured by a stationary camera, in which a large number of subjects (runners) are moving while a background image is still.
(3) Videos, such as a video of waves of the ocean, in which a large number of gradating parts, not single-colored parts, are moving.
(4) Videos, such as a video of a horse race, in which an background image is moving in one direction at high speed while a large number of subjects (horses and riders) are also moving.

That is, in a video in which a subject(s) moves and a large number of parts of the subject move, block noise tends to be easily observable and easily noticeable. Therefore, in light of such tendencies, the video processing device 200 of Embodiment 4 is configured such that the block noise evaluating section 230 evaluates, by use of luminance of a target decoded image (target frame) and by use of luminance of a decoded image previously received (previous frame), a degree to which the target decoded image is part of a video in which a subject(s) moves and a large number of parts of the subject move. Then, based on the degree thus evaluated, the reduction intensity setting section 250 sets an intensity of a noise reduction process.

(Details of Block Noise Evaluating Section 230)

The block noise evaluating section 230 includes a frequency distribution calculating section (frequency distribution calculating means) 231, a variance calculating section (variance calculating means) 232, a difference calculating section (difference calculating means) 233, and a pixel count calculating section (pixel count calculating means) 234.

(Frequency Distribution Calculating Section 231 and Variance Calculating Section 232)

The frequency distribution calculating section 231 receives luminance data of a decoded image from the decoding section 220. Then, the frequency distribution calculating section 231 calculates a luminance frequency distribution of the decoded image. Then, the frequency distribution calculating section 231 supplies the luminance frequency distribution to the variance calculating section 232.

The variance calculating section 232 receives the luminance frequency distribution from the frequency distribution calculating section 231, and then calculates an inter-frame variance (variance that exists between a target frame and a previous frame) in the luminance frequency distribution. Specifically, the variance calculating section 232 calculating the variance by (i) calculating, per class, a difference between a luminance frequency distribution during the target frame and the luminance frequency distribution during the previous frame and (ii) totaling absolute values (amounts) of the differences of the respective classes. The variance calculating section 232 supplies, to the reduction intensity setting section 250, the sum of the absolute values of the differences. Note that the previous frame can be a frame that comes immediately before the target frame, or can be a frame that comes a predetermined number of frames before the target frame.

Figure 8:
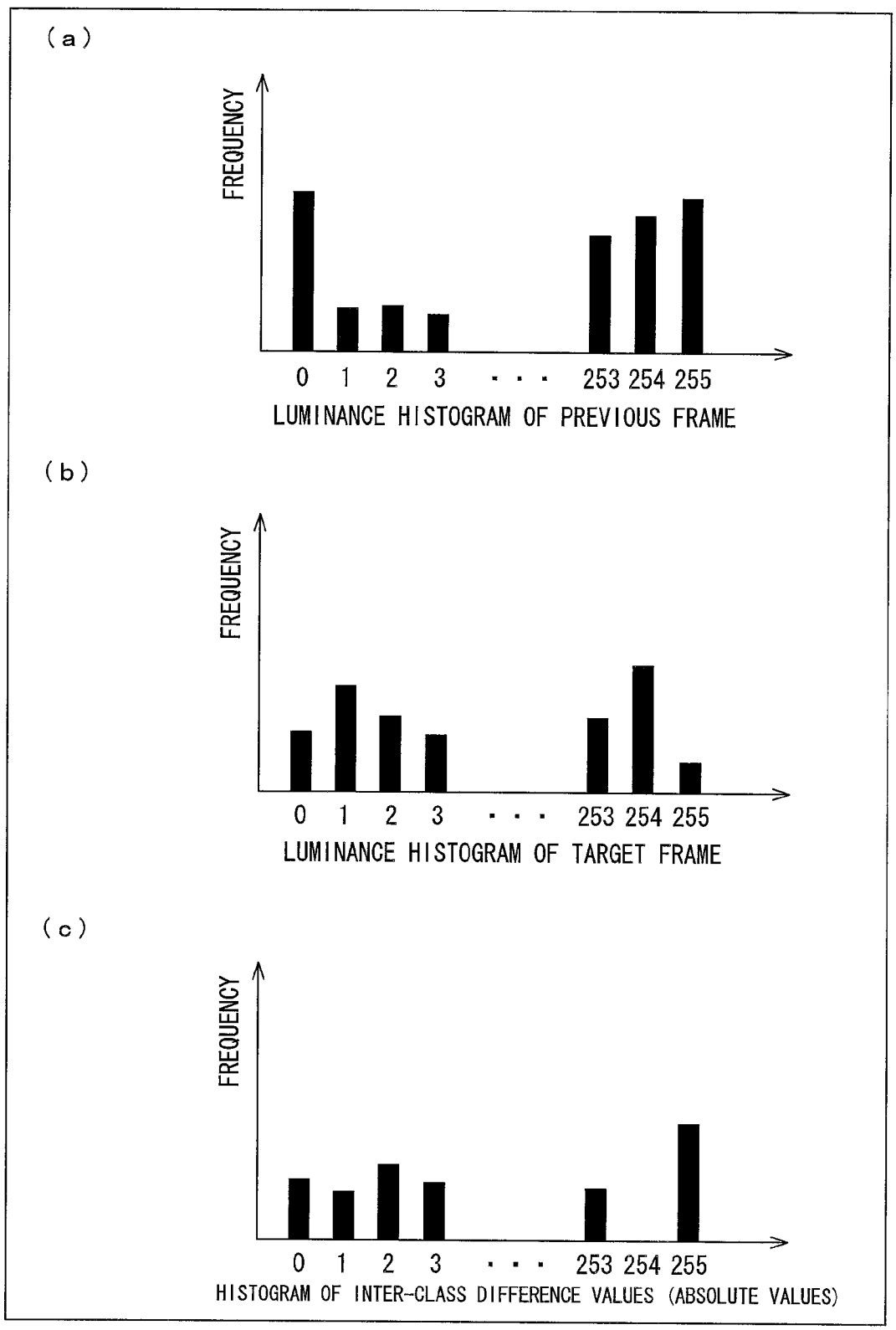
FIG. 8 is a histogram showing an example of frequency distributions calculated by a frequency distribution calculating section and a variance calculating section of the video processing device illustrated in FIG. 7.

FIG. 8 is a set of histograms showing an example of frequency distributions calculated by the frequency distribution calculating section 231 and the variance calculating section 232. (a) and (b) of FIG. 8 are a luminance histogram of a previous frame preceding a target frame and a luminance histogram of the target frame, respectively, which are calculated by the frequency distribution calculating section 231. (c) of FIG. 8 is a histogram of a variance (absolute value of inter-frame luminance difference) calculated by the variance calculating section 232. Note that the examples shown in FIG. 8 show 0 through 255 classes, but the present invention is not limited to such examples.

In a case where a subject stays within a video made up of a target frame and a previous frame, the variance is small even if, for example, the subject moves. For example, if a background image does not change, the histogram remains the same regardless of where in the video the subject is located. However, in a case where all or part of the subject moves in and out of a frame, the variance becomes large. That is, the variance serves as a basis for determining whether (i) the subject moves within the video or (ii) the subject moves from the inside of the video to the outside of the video or vice versa.

In the examples, a possibility of the subject moving within the video is determined as follows: In a case where the variance is equal to or less 10% (predetermined value) of the total number of pixels, the possibility is determined to be high. In a case where the variance is greater than 10% and less than 15% of the total number of the pixels, the possibility is determined to be fair. In a case where the variance is equal to or greater than 15% of the total number of the pixels, the possibility is determined to be small.

(Difference Calculating Section 233 and Pixel Count Calculating Section 234)

The difference calculating section 233 receives the luminance data of the decoded image from the decoding section 220, and then calculates, for each pixel of the decoded image, a luminance difference between the target frame and the previous frame. Then, the difference calculating section 233 supplies, to the pixel count calculating section 234, information on the luminance difference in each pixel.

The pixel count calculating section 234 receives the information on the luminance difference in each pixel from the difference calculating section 233, classifies the pixels into different classes based on absolute values (amounts) of their respective differences, and calculates the number of pixels in each class. Then, the pixel count calculating section 234 supplies, to the reduction intensity setting section 250, information on the number of pixels in each class.

In a case where a subject moves, an inter-frame luminance difference arises. Therefore, in the examples, the pixels are classified as described below based on the absolute values of their respective luminance differences. Note that a gradation of luminance consists of 1024 scales.

Pixels, in each of which the absolute value of the luminance difference falls in the range of 0 to 1, are regarded as pixels in which there are no movements, and are classified as "no difference." Pixels, in each of which the absolute value of the luminance difference falls in the range of 2 to 24, are regarded as pixels which contain a little noise, and are classified as "small difference." Pixels, in each of which the absolute value of the luminance difference fall in the range of 25 to 1023, are regarded as pixels in which there are movements, and are classified as "large difference."

In a case where a large number of parts of a subject move, the number of pixels, in which inter-frame luminance differences arise, becomes large. That is, the number of pixels classified as "large difference" (i.e. the number of pixels in each of which the absolute value of the luminance difference is equal to or greater than 25 (predetermined value)) corresponds to how large the number of moving parts of the subject is.

Figures 9, 10:
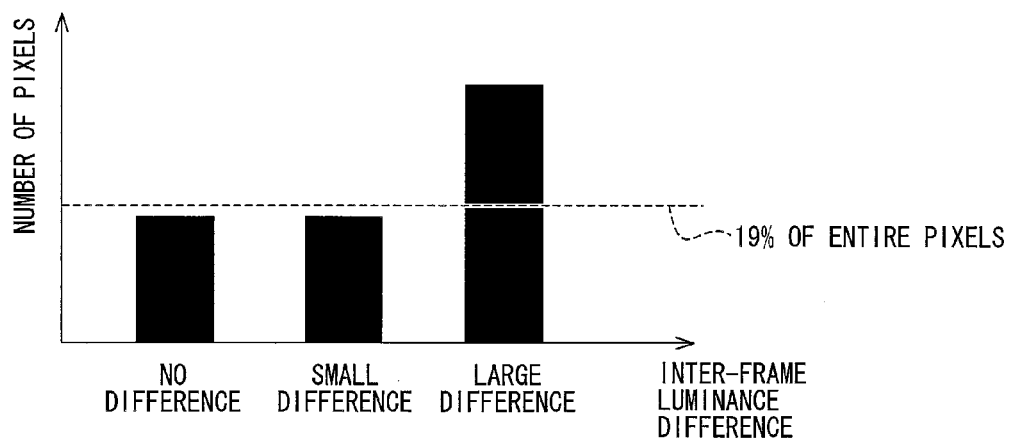
FIG. 9 is a histogram showing an example of the numbers of pixels in respective classes, which numbers are calculated by the pixel count calculating section of the video processing device illustrated in FIG. 7.
FIG. 10 is a view showing an example of a reduction intensity setting table stored in a storage section of the video processing device illustrated in FIG. 7.

FIG. 9 is a histogram showing an example of the numbers of pixels classified into respective classes in a video in which there is a movement. The example indicates that the number of pixels classified as "large difference" is greater than the number of pixels classified into the other classes.

In the example, in a case where the number of pixels classified as "large difference" is equal to or less than 15% of the total number of pixels, it is determined that the number of moving parts of the subject is small. In a case where the number of pixels classified as "large difference" is greater than 15% and less than 19% of the total number of pixels, it is determined that the number of moving parts of the subject is moderate. In a case where the number of pixels classified as "large difference" is equal to or greater than 19% (predetermined value) of the total number of pixels, it is determined that the number of moving parts of the subject is large. These numerical values are obtained as a result of analyzing videos of a marathon and the like.

(Reduction Intensity Setting Table 241)

FIG. 10 is a view illustrating the reduction intensity setting table 241 stored in the storage section 240. As illustrated in FIG. 10, in the reduction intensity setting table 241, an intensity (zero/low/moderate/high) of a block-noise reduction process is associated with (i) a ratio of the variance to the total number of pixels and (ii) a ratio of the number of pixels classified as "large difference" to the total number of pixels.

For example, in a case where (i) the variance is equal to or less than 10% of the total number of pixels and (ii) the number of pixels classified as "large difference" is equal to or greater than 19% of the total number of pixels, there is a high possibility that the subject is moving within the video, and a large number of parts of the subject are moving. This causes the video to be assumed to be a video in which block noise is noticeable, and therefore the intensity of the block noise reduction process is set to "high."

On the other hand, in a case where (i) the variance is equal to or greater than 15% of the total number of pixels and (ii) the number of pixels classified as "large difference" is equal to or less than 15% of the total number of pixels, there is a low possibility that the subject is moving within the video, and a small number of parts of the subject are moving. This causes the video to be assumed to be a video in which block noise is unnoticeable, and therefore the intensity of the block noise reduction process is set to "zero." In other words, no block noise reduction process is carried out.

Hence, the video processing device 200 of Embodiment 4 is capable of properly determining whether or not block noise in a video is noticeable. This makes it possible to suppress deterioration of display quality by performing a block noise reduction process on a video in which block noise is noticeable. In addition, it is possible not to perform a block noise reduction process on a video in which block noise is unnoticeable. This makes it possible to prevent the display quality of the video from deteriorating as a result of performing the block noise reduction process on the video. Therefore, it is possible to properly carry out a block noise reduction process.

(Operation of Video Processing Device 200)

Figure 11:
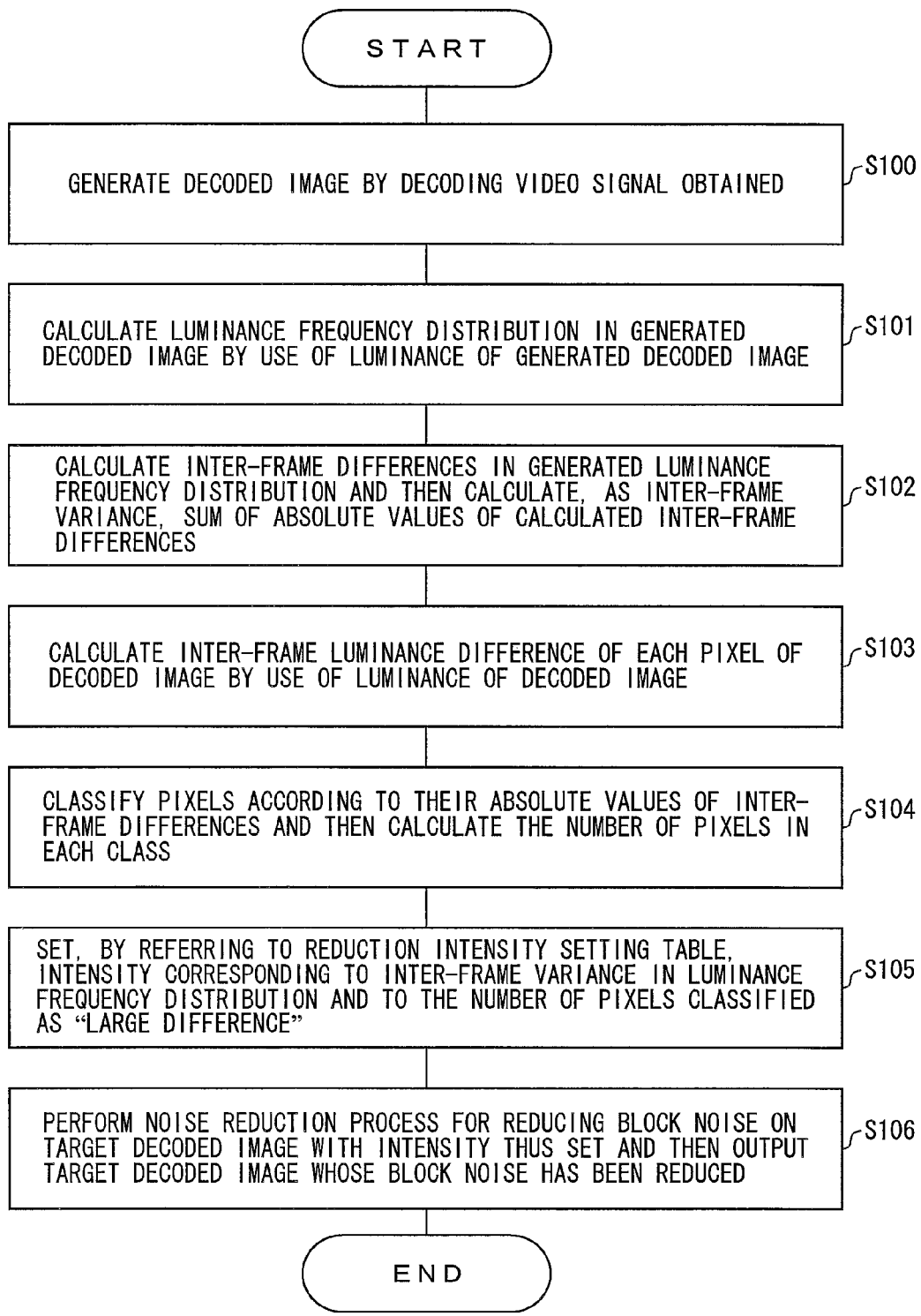
FIG. 11 is a flow chart showing a noise reduction process-related operation of the video processing device illustrated in FIG. 7.

Next, a noise reduction process-related operation of the video processing device 200 of Embodiment 4 will be described below with reference to FIG. 11. FIG. 11 is a flow chart showing the noise reduction process-related operation of the video processing device 200.

(Step S100: Generating Decoded Image)

In a case where the video obtaining section 210 obtains a video signal, the decoding section 220 generates a decoded image by decoding the video signal.

(Step S101: Calculating Luminance Frequency Distribution (Frequency Distribution Calculating Step))

The frequency distribution calculating section 231 calculates, by use of luminance of the decoded image generated by the decoding section 220, luminance frequency distributions of the decoded image (see (a) and (b) of FIG. 8).

(Step S102: Calculating Inter-Frame Variance in Frequency Distribution (Variance Calculating Step))

By use of the luminance frequency distributions calculated by the frequency distribution calculating section 231, the variance calculating section 232 calculates, for each class of luminance, a difference between (i) the luminance frequency distribution of a target frame (see (a) of FIG. 8) and (ii) the luminance frequency distribution of a previous frame (see (b) of FIG. 8). Then, the variance calculating section 232 calculates, as an inter-frame variance in luminance frequency distribution, the sum of absolute values (see (c) of FIG. 8) of the differences of the respective classes.

(Step S103: Calculating Inter-Frame Variance Concerning Luminance (Difference Calculating Step))

By use of the luminance of the decoded image generated by the decoding section 220, the difference calculating section 233 calculates, for each pixel of the decoded image, luminance difference between the target frame and a previous frame.

(Step S104: Calculating Frequency Distribution of Absolute Values of Differences (Pixel Count Calculating Step))

The pixel count calculating section 234 classifies the pixels based on the absolute values of the differences of the respective pixels which differences are calculated by the difference calculating section 233, and then calculates the number of pixels in each class (see FIG. 9).

(Steps S101 Through S104: Supplemental Explanation)

The steps S103 and S104 can be carried out before the steps S101 and S102, or can be carried out at the same time as the steps S101 and S102 are carried out (Step S105: Setting Intensity of Noise Reduction Process)

By referring to the reduction intensity setting table 241 (see FIG. 10) of the storage section 240, the reduction intensity setting section 250 sets an intensity of a noise reduction process, which intensity corresponds to evaluation results of the block noise evaluating section 230. Specifically, the reduction intensity setting section 250 sets the intensity that is associated with (i) a ratio of the inter-frame variance in luminance frequency distribution (calculated in the step S102) to the total number of pixels and (ii) a ratio of the number of pixels classified as "large difference" (calculated in the step S104) to the total number of pixels.

(Step S106: Noise Reduction Process (Noise Reducing Step))

The noise reducing section 260 performs a noise reduction process on the target decoded image with the intensity set by the reduction intensity setting section 250, which noise reduction process reduces block noise. Then, the noise reducing section 260 supplies, to a device outside of the video processing device 200, a target decoded image in which the block noise has been reduced. Thus the process ends.

Note that the video processing device 200 performs the above process on each of decoded images obtained by decoding the video signal.

(Advantages of Video Processing Device 200)

As has been described, according to the video processing device 200 of Embodiment 4, the block noise evaluating section 230 is capable of properly determining whether or not a target decoded image is an image in which block noise is noticeable. This allows the noise reducing section 260 to suppress deterioration of display quality by performing a block noise reduction process on a target decoded image in which block noise is noticeable. In addition, it is possible to configure the noise reducing section 260 not to perform a block noise reduction process on a target decoded image in which block noise is unnoticeable. This makes it possible to prevent the display quality of the target decoded image from deteriorating as a result of performing the block noise reduction process on the target decoded image.

Based on the variance calculated by the variance calculating section 232 and on the number of pixels calculated by the pixel count calculating section 234, the reduction intensity setting section 250 sets an intensity of the block noise reduction. The noise reducing section 260 carries out the block noise reduction with the intensity set by the reduction intensity setting section 250. This allows the block noise reduction to be carried out with an intensity according to how noticeable the block noise is in the target decoded image, and therefore makes it possible to properly suppress the deterioration of the display quality.

Embodiment 5

Figure 12:
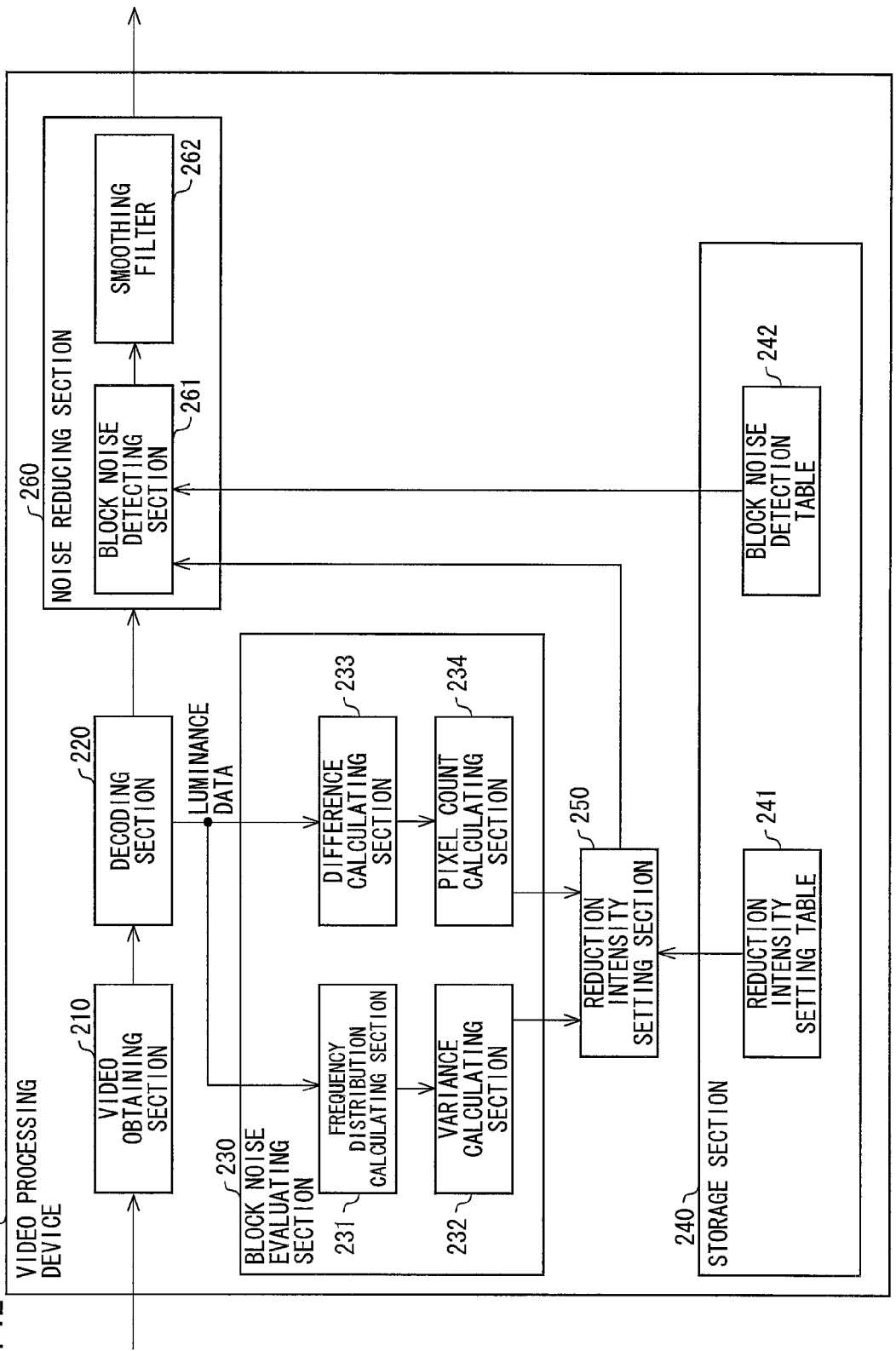
FIG. 12 is a block diagram illustrating a main configuration of a video processing device in accordance with another embodiment of an invention related to the present invention.

The following description will discuss another embodiment of the present invention. FIG. 12 is a block diagram illustrating a main configuration of a video processing device 200 in accordance with Embodiment 5. The video processing device 200 illustrated in FIG. 12 is similar in configuration to the video processing device 200 illustrated in FIGS. 7 through 11 except that, according to the video processing device 200 illustrated in FIG. 12, (i) a noise reducing section 260 includes a block noise detecting section (block noise detecting means) 261 and a smoothing filter (smoothing means) 262 and (ii) a storage section 240 stores a block noise detection table 242. Note that members similar in function to those described in the above embodiments will be assigned the same reference signs, and their description will be omitted.

The block noise detection table 242 is used for parameters for detecting block noise. The block noise detecting section 261 and the smoothing filter 262 are intended to reduce block noise in a target decoded image.

(Block Noise Detecting Section 261)

The block noise detecting section 261 refers to the block noise detection table 242 of the storage section 240, and detects block noise in a target decoded image with the use of a parameter corresponding to an intensity set by a reduction intensity setting section 250. Then, the block noise detecting section 261 notifies the smoothing filter 262 of location information on a location of the block noise thus detected.

Specifically, the block noise detecting section 261 first detects, as an edge part, a part of the target decoded image, at which part a luminance difference between adjacent pixels is equal to or greater than a threshold value (edge threshold value). Next, the block noise detecting section 261 calculates evenness in the vicinity of the edge part thus detected. Note that the evenness indicates how even respective luminances are (i.e. how small the luminance difference is), and is calculated by the formula below. The evenness is set in the range of, for example, 0 to 255, and a smaller value indicates a greater degree of evenness.

As one example of a method of calculating the evenness, the following method can be employed: First, adjacent pixels extending in a given direction (horizontal direction or vertical direction) are subjected to determination one after another, so that it is determined whether or not the adjacent pixels include an edge part. In a case where an edge part is determined, luminance value differences between adjacent pixels of 16 pixels are calculated, the 16 pixels having been subjected to the determination immediately before the adjacent pixels thus determined to be the edge part, that is, the 16 pixels extending in line from the adjacent pixels in a direction opposite the given direction. Then, an average of the absolute values of the luminance value differences is calculated as evenness.

Specifically, on the assumption that the luminance values of the 16 pixels are Y0 to Y15, respectively, the evenness can be calculated by use of the following Formula (1):

$$\text{Evenness} = (|Y0-Y1|+|Y1-Y2|+|Y2-Y3|+\ldots+|Y13-Y14|+|Y14-Y15|)/15 \quad (1)$$

wherein |α| indicates an absolute value of α. Note that if the luminance values Y0 to Y15 fall in the range of 0 to 255, the calculation of Formula (1) accordingly falls in the range of 0 to 255.

Next, in a case where the evenness thus calculated is equal to or less than a threshold value (noise threshold value), the block noise detecting section 261 determines that the edge part is an edge part of the block noise. Then, the block noise detecting section 261 notifies the smoothing filter 262 of the location of the edge part of the block noise.

According to Embodiment 5, the edge threshold value of the luminance difference and the noise threshold value of the evenness each vary, depending on an intensity of a noise reduction process, which intensity is set by the reduction intensity setting section 250. The block noise detection table 242 stores correspondences (i) between the intensity and the edge threshold value and (ii) between the intensity and the noise threshold value.

(Block Noise Detection Table 242)

FIG. 13 is a view illustrating the block noise detection table 242 stored in the storage section 240. In the table illustrated in FIG. 13, a higher intensity of the noise reduction process corresponds to a lower edge threshold value of the luminance difference. This allows the block noise detecting section 261 to easily detect an edge part. In addition, a higher intensity corresponds to a higher noise threshold value of the evenness. This allows the block noise detecting section 261 to easily determine the edge part (thus detected) as an edge part of block noise. Note that in a case where the intensity is "zero", a block noise reduction process is not carried out. Therefore, the edge threshold value and the noise threshold value are not set for a "zero" intensity.

(Smoothing Filter 262)

In accordance with the location information from the block noise detecting section 261, the smoothing filter 262 performs smoothing on the edge part of the block noise in the target decoded image. This causes a luminance variance at the edge part of the block noise to be gradual, and therefore causes a reduction in the block noise. Note that the smoothing filter 262 can change the intensity of the smoothing in accordance with an intensity set by the reduction intensity setting section 250.

(Advantages of Video Processing Device 200)

As has been described, according to the video processing device 200 of Embodiment 5, (i) the block noise detecting section 261 detects an edge part of block noise contained in a target decoded image and (ii) the smoothing filter 262 performs smoothing on the edge part. This makes it possible to perform smoothing on only an edge part of block noise of a target decoded image, and therefore makes it possible to prevent display quality from deteriorating as a result of performing the smoothing on a remaining part(s) of the block noise of the target decoded image.

In addition, the block noise detecting section 261 is configured to more easily detect an edge part of the block noise with a higher intensity set by the reduction intensity setting section 250. This makes it possible to detect and smooth an edge part of the block noise in a target decoded image in accordance with the degree to which the block noise is noticeable. Consequently, it is possible to properly suppress deterioration of display quality.

Modification

Block noise is observed to a great extent in a bright video. Therefore, it is possible to (i) calculate an average picture level (APL) of a target decoded image and (ii) (a) increase an intensity of a noise reduction process in a case where the APL thus calculated is high (i.e. an overall brightness of the target decoded image is high) (b) lower the intensity in a case where the APL is low (i.e. the overall brightness of the target decoded image is low). In this case, it is possible to carry out a block noise reduction process more effectively.

Embodiment 6

Figure 14:
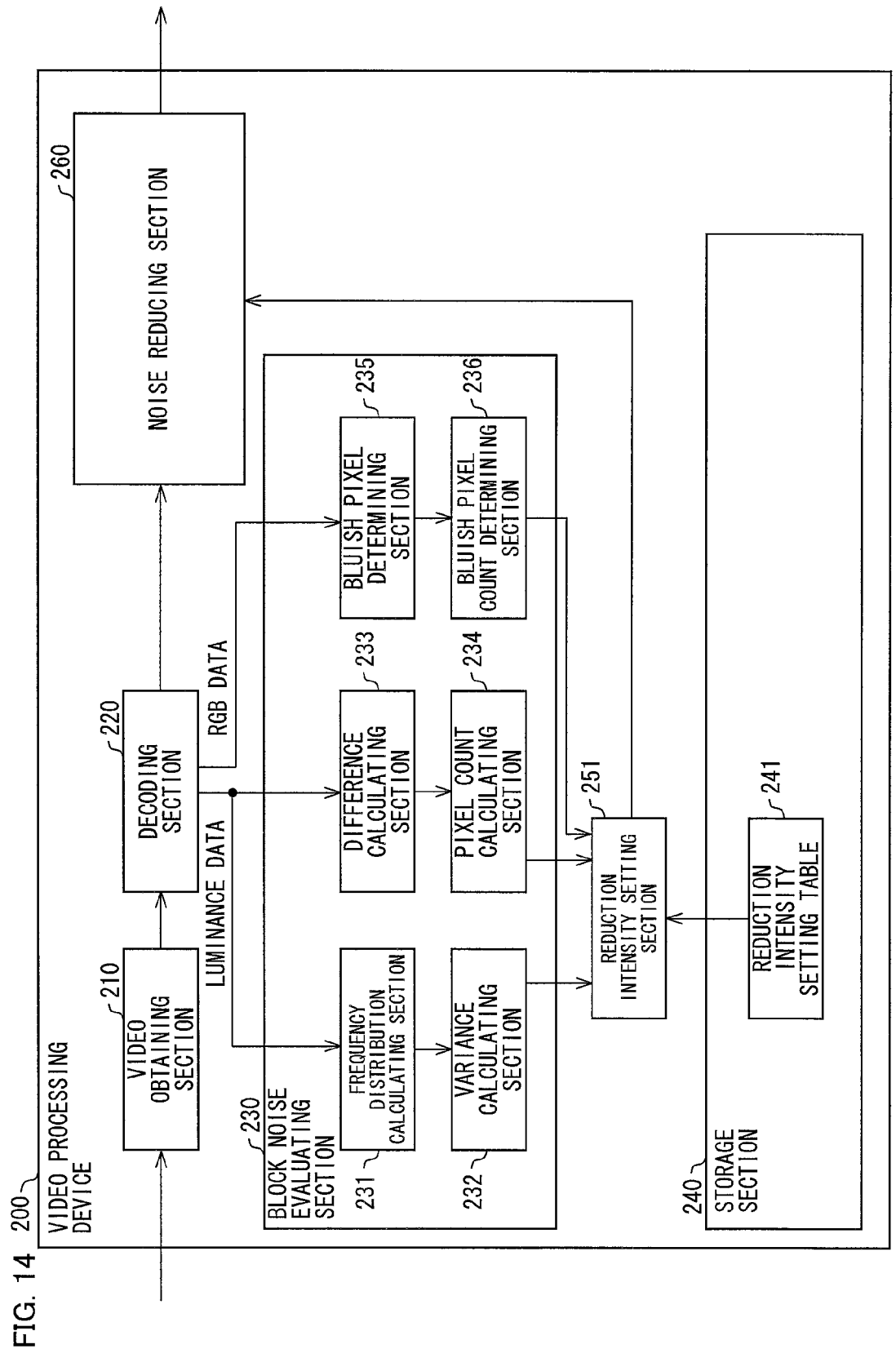
FIG. 14 is a block diagram illustrating a main configuration of a video processing device in accordance with a further embodiment of the invention related to the present invention.

The following description will discuss another embodiment of the present invention. FIG. 14 is a block diagram illustrating a main configuration of a video processing device 200 in accordance with Embodiment 6. The video processing device 200 illustrated in FIG. 14 is similar in configuration to the video processing device 200 illustrated in FIGS. 7 through 11 except that, according to the video processing device 200 illustrated in FIG. 14, a block noise evaluating section 230 includes a bluish pixel determining section (bluish pixel determining means) 235 and a bluish pixel count determining section (bluish pixel count determining means) 236. Note that members similar in function to those described in the above embodiments are assigned the same reference signs, and their description will be omitted.

As described earlier, block noise is observed to a great extent in a video of waves of the ocean. Therefore, according to Embodiment 6, (i) it is determined whether or not pixels in a target decoded image have bluish color, (ii) the number of bluish-color pixels is calculated, and (iii) (a) an intensity of a noise reduction process is increased in a case where the number of bluish-color pixels is large and (b) the intensity is lowered in a case where the number of bluish-color pixels is small. This allows a block noise reduction process to be carried out in accordance with a scene of a video, and therefore makes it possible to properly suppress deterioration of display quality.

(Bluish Pixel Determining Section 235)

The bluish pixel determining section 235 receives, from a decoding section 220, RGB data of a decoded image generated by the decoding section 220, and then determines, based on the RGB data thus received, whether or not the color of the pixels of the decoded image is bluish. The bluish pixel determining section 235 supplies determined results to the bluish pixel count determining section 236.

Whether or not the color of the pixels is bluish can be determined by determining whether or not the following Formulas (2) and (3) are both satisfied:

$$(G(\text{green})\text{gradation value of the pixels}) > (R(\text{red})\text{gradation value of the pixels}) \quad (2)$$

$$(B(\text{blue})\text{gradation value of the pixels}) > (R(\text{red})\text{gradation value of the pixels}) \quad (3)$$

Figure 15:
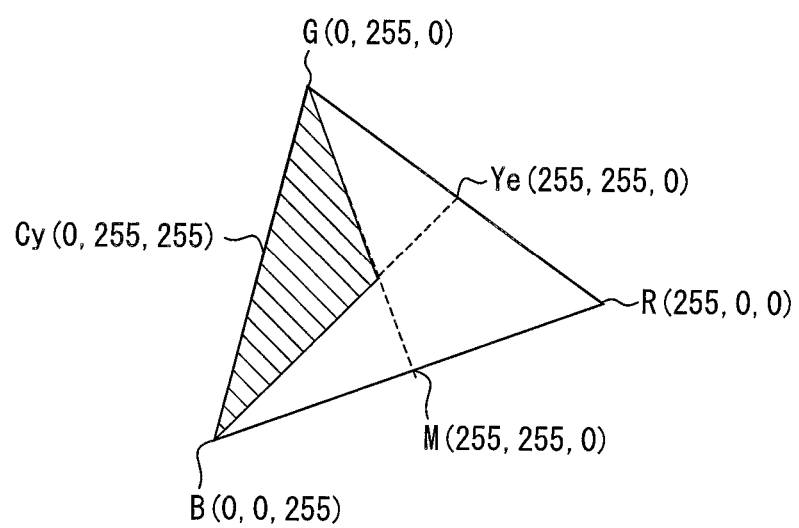
FIG. 15 is a graph showing the color gamut in a general chromaticity diagram.

The reason that the above determination can be made by Formulas (2) and (3) will be described below with reference to FIG. 15. FIG. 15 is a graph showing the color gamut in a general chromaticity diagram. FIG. 15 shows cyan (Cy), magenta (M), and yellow (Ye) in addition to red (R), green (G), and blue (B), and shows each of the RGB components in gradation values of 0 to 255.

In the color gamut shown in FIG. 15, a region satisfying Formula (2) is a region expanding toward a point G from a line segment connecting a point B and a point Ye. On the other hand, a region satisfying Formula (3) is a region expanding toward the point B from a line segment connecting the point G and a point M. Therefore, a region satisfying both of Formulas (2) and (3) is a hatched region of FIG. 15, and is a region representing bluish color.

(Bluish Pixel Count Determining Section 236)

By use of the determined results supplied from the bluish pixel determining section 235, the bluish pixel count determining section 236 determines the number of pixels which are included in the target decoded image and which have bluish color. Specifically, the bluish pixel count determining section 236 only needs to count the number of determined results indicative of the bluish color. Then, the bluish pixel count determining section 236 supplies, to a reduction intensity setting section 250, the number of pixels having bluish color. In a case where the number of pixels having bluish color is large, the reduction intensity setting section 250 increases an intensity of a noise reduction process, which intensity is set in view of a reduction intensity setting table 241 stored in a storage section 240. In a case where the number of pixels having bluish color is small, the reduction intensity setting section 250 lowers the intensity of the noise reduction process. Then, the reduction intensity setting section 250 supplies information on the intensity to the noise reducing section 260. This causes block noise in a video of, for example, waves of the ocean to be largely reduced because the video has a large amount of bluish color. Therefore, it is possible to properly suppress deterioration of display quality.

(Additional Remark 1)

The block noise reduction process described above can be mainly classified into:

3D noise reduction process 2D noise reduction process.

Note that the 3D noise reduction process is carried out by referring to a target frame and to one or more other frames.

Specifically, the 3D noise reduction process is a process in which an image after a noise reduction is generated by working out an average, for each pixel, of (i) a target region during a target frame and (ii) a target region during one or more reference frames before and/or after the target frame timewise.

In a case where a 3D noise reduction process with a higher intensity is set by the reduction intensity setting section, the noise reducing section increases the number of reference frames. In a case where a 3D noise reduction process with a lower intensity is set by the reduction intensity setting section, the noise reducing section decreases the number of reference frames.

Note also that the above-described averaging process in the 3D noise reduction process may employ a weighting factor that is set so that an image after the noise reduction has high image quality.

On the other hand, a 2D noise reduction process is carried out by referring to (i) a target pixel during a target frame and (ii) reference pixels within a reference region set to surround the target pixel during the target frame.

Specifically, the 2D noise reduction process is a process in which an image after a noise reduction is generated by working out an average of (i) a pixel value of a target pixel during a target frame and (ii) pixel values of reference pixels within a reference region set to surround the target pixel during the target frame.

In a case where a 2D noise reduction process with a higher intensity is set by the reduction intensity setting section, the noise reducing section causes the reference region to large. In a case where a 2D noise reduction process with a lower intensity is set by the reduction intensity setting section, the noise reducing section causes the reference region to be small.

Note also that the above-described averaging process in the 2D noise reduction process may employ a weighting factor that is set so that an image after the noise reduction has high image quality.

(Additional Remark 2)

The present invention is not limited to the above-described video processing device 200. For example, the present invention can be realized as a television receiver including: a video obtaining section 210; a decoding section 220; a block noise evaluating section 230; a storage section 240; a reduction intensity setting section 250; a noise reducing section 260; and a display section (displaying means, not illustrated), the decoding section 220 being configured to carry out decoding of a TS (Transport Stream) received as a broadcast signal, and the display section being configured to display an image obtained by the decoding.

[Summary]

A video processing device (video processing device 200) in accordance with Aspect 1 of the present invention is a video processing device for reducing block noise in an image obtained by decoding a video signal, said video processing device including: frequency distribution calculating means (frequency distribution calculating section 231) for calculating a luminance frequency distribution in the image; variance calculating means (variance calculating section 232) for calculating an inter-frame variance in the luminance frequency distribution calculated by the frequency distribution calculating means; difference calculating means (difference calculating section 233) for calculating an inter-frame luminance difference of each of pixels of the image; pixel count calculating means (pixel count calculating section 234) for calculating the number of pixels whose inter-frame luminance differences calculated by the difference calculating means are each equal to or greater than a difference predetermined value; and noise reducing means (noise reducing section 260) for performing a block noise reduction on the image in a case where (i) the inter-frame variance calculated by the variance calculating means is equal to or less than a variance predetermined value and (ii) the number of pixels calculated by the pixel count calculating means is equal to or greater than a pixel-count predetermined value.

According to the configuration, a luminance frequency distribution in an image obtained by decoding a video signal is first calculated, and an inter-frame variance in the luminance frequency distribution is then calculated. In a case where a subject exists in the image, the variance is small even if, for example, the subject moves. However, in a case where all or part of the subject moves in and out of a frame, the variance becomes large. That is, the variance serves as a basis for determining whether (i) the subject moves within the video or (ii) the subject moves from the inside of the video to the outside of the video or vice versa.

Meanwhile, an inter-frame luminance difference of each pixel in the image is calculated, and the number of pixels whose inter-frame luminance differences are each equal to or greater than a predetermined value is then calculated. In a case where the subject moves, inter-frame luminance differences arise. In a case where a large number of parts of a subject move, the number of pixels, in which inter-frame luminance differences arise, becomes large. That is, the number of pixels, in which the luminance differences are each equal to or greater than a predetermined value, corresponds to how large the number of moving parts of the subject is.

Then, in a case where the variance thus calculated is equal to or less than its predetermined value and where the number of pixels thus calculated is equal to or greater than its predetermined value, the video is regarded as a video in which a subject(s) moves and a large number of parts of the subject(s) move. This causes the video to be subjected to a block noise reduction.

Therefore, with the present invention, it is possible to properly determine whether or not block noise in a video is noticeable. This makes it possible to suppress deterioration of display quality by performing a block noise reduction process on a video in which block noise is noticeable. In addition, it is possible not to perform a block noise reduction process on a video in which block noise is unnoticeable. This makes it possible to prevent the display quality of the video from deteriorating as a result of performing the block noise reduction process on the video.

Note that the inter-frame variance only needs to be obtained by (i) calculating, in each class, a difference between a luminance frequency distribution of an image of a target frame and a luminance frequency distribution of an image of a frame before the target frame and (ii) totaling absolute values of the differences of the respective classes.

The video processing device in accordance with Aspect 2 of the present invention is preferably configured in Aspect 1 to further include: intensity setting means (reduction intensity setting section 250) for setting an intensity of the block noise reduction in accordance with the inter-frame variance calculated by the variance calculating means and with the number of pixels calculated by the pixel count calculating means, the noise reducing means performing the block noise reduction on the image with the intensity set by the intensity setting means. This makes it possible to reduce the block noise in the image with an intensity in accordance with how noticeable the block noise is, and therefore makes it possible to properly suppress deterioration of display quality.

The video processing device in accordance with Aspect 3 of the present invention is preferably configured in Aspect 1 such that the noise reducing means includes block noise detecting means (block noise detecting section 261) for detecting an edge part of the block noise in the image and smoothing means (smoothing filter 262) for performing smoothing on the edge part. This makes it possible to perform smoothing on only an edge part of the block noise of the image, and therefore makes it possible to prevent display quality from deteriorating as a result performing the smoothing on another part(s) of the image.

The video processing device in accordance with Aspect 4 of the present invention is preferably configured in Aspect 3 to further include: intensity setting means (reduction intensity setting section 250) for setting an intensity of the block noise reduction in accordance with the inter-frame variance calculated by the variance calculating means and with the number of pixels calculated by the pixel count calculating means, the block noise detecting means more easily detecting the edge part of the block noise with a higher intensity set by the intensity setting means.

In this case, it is possible to detect and smooth an edge part of the block noise in the video in accordance with the degree to which the block noise is noticeable. For example, it is possible to detect a large number of edge parts of block noise in a video containing noticeable block noise, and smooth the edge parts. On the other hand, it is possible to detect a small number of edge parts of block noise in a video containing unnoticeable block noise, and smooth the edge parts. Consequently, it is possible to properly suppress deterioration of display quality.

Note that block noise is observed to a great extent in a bright image. Therefore, the video processing device in accordance with Aspect 5 of the present invention is preferably configured in Aspect 2 or 4 such that the intensity setting means changes, in accordance with an average picture level (APL) of the image, the intensity that has been set. This causes the intensity of the noise reduction process to be (i) increased in a case where the APL is high (i.e. an overall brightness of the image is high) and (ii) lowered in a case where the APL is low (i.e. the overall brightness is low). Consequently, it is possible to more effectively carry out the block noise reduction process.

Note also that block noise is observed to a great extent in a video of waves of the ocean. Therefore, the video processing device in accordance with Aspect 6 of the present invention can be configured in each of Aspects 2, 4, and 5 to further include: bluish pixel determining means (bluish pixel determining section 235) for individually determining whether or not the pixels of the image have bluish color; and bluish pixel count determining means (bluish pixel count determining section 236) for determining, based on results of the determining by the bluish pixel determining means, the number of pixels having bluish color, the intensity setting means changing, in accordance with the number of pixels determined by the bluish pixel count determining means to have bluish color, the intensity that has been set. This allows the intensity of the noise reduction process to be (i) increased in a case where the number of pixels having bluish color is large and (ii) lowered in a case where the number of pixels having bluish color is small. This allows a block noise reduction process to be carried out in accordance with a scene of an image, and therefore makes it possible to properly suppress deterioration of display quality.

Advantageous effects similar those described above can be produced by a television receiver including: a video processing device in accordance with each of Aspects 1 through 6 of the present invention; and displaying means for an image supplied from the video processing device.

A video processing method in accordance with Aspect 7 of the present invention is a video processing method for reducing block noise in an image obtained by decoding a video signal, including the steps of: (a) calculating a luminance frequency distribution in the image; (b) calculating an inter-frame variance in the luminance frequency distribution calculated in the step (a); (c) calculating an inter-frame luminance difference of each of pixels of the image; (d) calculating the number of pixels whose inter-frame luminance differences calculated in the step (c) are each equal to or greater than a difference predetermined value; and (e) performing a block noise reduction on the image in a case where (i) the inter-frame variance calculated in the step (b) is equal to or less than a variance predetermined value and (ii) the number of pixels calculated in the step (d) is equal to or greater than a pixel-count predetermined value. With the method, it is possible to produce advantageous effects similar to those produced in Aspect 1.

The video processing device in accordance with each aspect of the present invention can be realized by a computer. In this case, the scope of the present invention also encompasses (i) a program for controlling the video processing device, the program realizing the video processing device by use of a computer through causing the computer to serve as each of the means included in the video processing device and (ii) a computer-readable storage medium in which the program is stored.

The invention related to the present invention has been thus described.

(Program and Storage Medium)

Blocks of the video processing devices 100, 100', 100", and 200 may be realized as hardware by a logic circuit provided on an integrated circuit (IC chip) or may be realized as software by a CPU (Central Processing Unit).

In the latter case, the video processing devices 100, 100', 100", and 200 each include a CPU (central processing unit) and storage device (memory media). The CPU (central processing unit) executes instructions in control programs realizing the functions. The examples of the storage device include a ROM (read only memory) which contains programs, a RAM (random access memory) to which the programs are loaded, and a memory containing the programs and various data. The object of the present invention can also be achieved by mounting on the video processing devices 100, 100', 100", and 200 a computer-readable storage medium containing control program code (executable program, intermediate code program, or source program) for each of the video processing devices 100, 100', 100", and 200, which is software realizing the aforementioned functions, in order for the computer (or CPU, MPU) to retrieve and execute the program code contained in the storage medium.

As the storage medium, a non-transitory storage medium can be used. Examples of the non-transitory tangible medium encompass (i) tapes such as a magnetic tape and a cassette tape, (ii) disks including magnetic disks such as a Floppy Disk (Registered Trademark) and a hard disk and optical disks such as a CD-ROM, an MO, an MD, a DVD, and a CD-R, (iii) cards such as an IC card (including a memory card) and an optical card, (iv) semiconductor memories such as a mask ROM, an EPROM, an EEPROM (Registered Trademark), and a flash ROM, and (v) logic circuits such as a PLD (Programmable logic device) and an FPGA (Field Programmable Gate Array).

Furthermore, the program code can be supplied to the video processing devices 100, 100', 100", and 200 via the communications network. The communications network is not limited to any particular one, provided that the program code can be transmitted via the communications network. Examples of the communications network encompass the Internet, an intranet, an extranet, a LAN, an ISDN, a VAN, a CATV communications network, a virtual dedicated network (virtual private network), a telephone line network, a mobile communications network, and a satellite communications network. A transfer medium for constituting the communications network only needs to be a medium via which the program code can be transmitted, and is not limited to any particular configuration or any type. Examples of the transfer medium encompass (i) wired lines such as IEEE 1394, a USB, an electric power line, a cable TV line, a telephone line, and an ADSL (Asymmetric Digital Subscriber Line) and (ii) wireless communications such as an infrared radiation (e.g. IrDA and remote control), Bluetooth (Registered Trademark), IEEE 802.11 wireless, HDR (High Data Rate), NFC (Near Field Communication), DLNA (Digital Living Network Alliance), a mobile telephone network, a satellite line, and a terrestrial digital network.

The present invention and the invention related to the present invention are not limited to the description of the embodiments, but can be altered in many ways by a person skilled in the art within the scope of the claims. An embodiment derived from a proper combination of technical means disclosed in different embodiments is also encompassed in the technical scope of the present invention. In addition, a new technical feature can be obtained by combining together the technical means disclosed in the embodiments.

INDUSTRIAL APPLICABILITY

The present invention is suitable for a video processing device for reducing noise in a video.

REFERENCE SIGNS LIST 100, 100' Video processing device
100" Video processing device
110 Video obtaining section
120 Decoding section
130 Storage section
140, 140' Histogram processing section
141 Edge histogram generating section (first generating means)
142 Luminance histogram generating section (second generating means)
143 Feature value calculating section (calculating means)
150, 150' Noise reducing section (smoothing means, adjusting means, first determining means, second determining means, third determining means)
150" Noise reducing section (sub-adjusting means, image quality mode determining means, genre determining means)
200 Video processing device
210 Video obtaining section
220 Decoding section
230 Block noise evaluating section
231 Frequency distribution calculating section (frequency distribution calculating means)
232 Variance calculating section (variance calculating means)
233 Difference calculating section (difference calculating means)
234 Pixel count calculating section (pixel count calculating means)
235 Bluish pixel determining section (bluish pixel determining means)
236 Bluish pixel count determining section (bluish pixel count determining means)
240 Storage section
241 Reduction intensity setting table
242 Block noise detection table
250 Reduction intensity setting section (intensity setting means)
260 Noise reducing section (noise reducing means)
261 Block noise detecting section (block noise detecting means)
262 Smoothing filter (smoothing means)

The invention claimed is:

1. An image processing device comprising:
a first generating section configured to generate, as first frequency distribution data, frequency distribution data concerning how large luminance differences are between (i) pixels constituting an image and (ii) their respective adjacent pixels;
a first determining section configured to determine whether or not a first ratio of a sum of frequencies of classes higher than a predetermined class of the first frequency distribution data to a sum of all frequencies of the first frequency distribution data is equal to or greater than a first predetermined threshold value;
a smoothing section configured to perform a smoothing process on the image; and
an adjusting section configured to adjust, in a case where the first determining section determines that the first ratio is equal to or greater than the first predetermined threshold value, a smoothing intensity of the smoothing process to be an intensity higher than that of the smoothing process performed in a case where the first determining section determines that the first ratio is less than the first predetermined threshold value,
the smoothing section being configured to perform the smoothing process on the image with a smoothing intensity that has been adjusted by the adjusting section.

2. An image processing device as set forth in claim 1, further comprising:
a second generating section configured to generate, as second frequency distribution data, frequency distribution data concerning levels of luminances of the respective pixels constituting the image are; and
a second determining section configured to determine whether or not a second ratio of a sum of frequencies of classes higher than a predetermined class of the second frequency distribution data to a sum of all frequencies of the second frequency distribution data is equal to or greater than a second predetermined threshold value;
the adjusting section being configured to adjust, in a case where the first determining section determines that the first ratio is equal to or greater than the first predetermined threshold value and where the second determining section determines that the second ratio is equal to or greater than the second predetermined threshold value, the smoothing intensity of the smoothing process to an intensity higher than that of the smoothing process performed in a case where the first determining section determines that the first ratio is less than the first predetermined threshold value and where the second determining section determines that the second ratio is less than the second predetermined threshold value.

3. An image processing device as set forth in claim 2, further comprising:
a calculating section configured to calculate an average picture level of the image; and
a third determining section configured to determine whether or not the average picture level is equal to or greater than a third predetermined threshold value,
the adjusting section being configured to adjust, in a case where (i) the first determining section determines that the first ratio is equal to or greater than the first predetermined threshold value, (ii) the second determining section determines that the second ratio is equal to or greater than the second predetermined threshold value, and (iii) the third determining section determines that the average picture level is equal to or greater than the third predetermined threshold value, the smoothing intensity of the smoothing process to a level higher than that of the smoothing process performed in a case where (i) the first determining section determines that the first ratio is less than the first predetermined threshold value, (ii) the second determining section determines that the second ratio is less than the second predetermined threshold value, and (iii) the third determining section determines that the average picture level is less than the third predetermined threshold value.

4. The image processing device as set forth in claim 1, wherein the adjusting section includes a sub-adjusting section configured to (i) adjust the smoothing intensity to a high level in a case where a resolution of image data, on which the image is based, is less than a screen resolution of a display section displaying the image and (ii) adjust the smoothing intensity to a low level in a case where the resolution of the image data is equal to or greater than the screen resolution of the display section.

5. An image processing device as set forth in claim 1, further comprising:
an image quality mode determining section configured to determine an image quality mode set in the image processing device,
the smoothing section being configured not to perform the smoothing process on the image in a case where the image quality mode is set to a movie mode.

6. A moving image processing device comprising each of the sections included in an image processing device as set forth in claim 1,
the first generating section being configured to generate the first frequency distribution data from each one of image frames constituting a moving image,
the first determining section being configured to determine whether or not the first ratio is equal to or greater than the first predetermined threshold value in the first frequency distribution data,
the adjusting section being configured to adjust the smoothing intensity of the smoothing process in accordance with whether or not the first determining section determines that the first ratio is equal to or greater than the first predetermined threshold value, and
the smoothing section being configured to perform a smoothing process on said each one of the image frames with a smoothing intensity that has been adjusted by the adjusting section.

7. A moving image processing device as set forth in claim 6, further comprising:
a genre determining section configured to determine a genre to which content of the moving image belongs,
the smoothing section being configured not to perform the smoothing process on each one of the image frames in a case where the genre is movie.

8. A computer-readable non-transitory storage medium in which a program for causing a computer to operate as an image processing device as set forth in claim 1 is stored, the program causing the computer to serve as each of the sections of the image processing device.

9. A television receiver comprising each of the sections included in a moving image processing device as set forth in claim 6.

10. A method of processing an image performed by an image processing device having a generating section, a determining section, a smoothing section, and an adjusting section, comprising the steps of:
(a) generating, by the generating section, frequency distribution data concerning how large luminance differences are between (i) pixels constituting an image and (ii) their respective adjacent pixels;
(b) determining, by the determining section, whether or not a ratio of a sum of frequencies of classes higher than a predetermined class of the frequency distribution data to a sum of all frequencies of the frequency distribution data is equal to or greater than a predetermined threshold value;
(c) performing, by the smoothing section, a smoothing process on the image; and
(d) adjusting, by the adjusting section, in a case where the ratio is determined to be equal to or greater than the predetermined threshold value in the step (b), a smoothing intensity of the smoothing process to a level higher than that of the smoothing process performed in a case where the ratio is determined to be less than the predetermined threshold value,
in the step (c), a smoothing process being performed on the image with a smoothing intensity that has been adjusted in the step (d).

11. A video processing device for reducing block noise in an image obtained by decoding a video signal, said video processing device comprising:
a frequency distribution calculating section configured to calculate a luminance frequency distribution in the image;
a variance calculating section configured to calculate an inter-frame variance in the luminance frequency distribution calculated by the frequency distribution calculating section;
a difference calculating section configured to calculate an inter-frame luminance difference of each of pixels of the image;
a pixel count calculating section configured to calculate the number of pixels whose inter-frame luminance differences calculated by the difference calculating section are each equal to or greater than a difference predetermined value; and
a noise reducing section configured to perform a block noise reduction on the image in a case where (i) the inter-frame variance calculated by the variance calculating section is equal to or less than a variance predetermined value and (ii) the number of pixels calculated by the pixel count calculating section is equal to or greater than a pixel-count predetermined value.

12. A video processing device as set forth in claim 11, further comprising:
an intensity setting section configured to set an intensity of the block noise reduction in accordance with the inter-frame variance calculated by the variance calculating section and with the number of pixels calculated by the pixel count calculating section,
the noise reducing section performing the block noise reduction on the image with the intensity set by the intensity setting section.

13. The video processing device as set forth in claim 12, wherein the intensity setting section changes, in accordance with an average picture level of the image, the intensity that has been set.

14. The video processing device as set forth in claim 11, wherein:

the noise reducing section includes
- a block noise detecting section configured to detect an edge part of the block noise in the image and
- a smoothing section configured to perform smoothing on the edge part.

15. A video processing device as set forth in claim 14, further comprising:
- an intensity setting section configured to set an intensity of the block noise reduction in accordance with the inter-frame variance calculated by the variance calculating section and with the number of pixels calculated by the pixel count calculating section,
- the block noise detecting section more easily detecting the edge part of the block noise with a higher intensity set by the intensity setting section.

16. A video processing device as set forth in claim 12, further comprising:
- a bluish pixel determining section configured to individually determine whether or not the pixels of the image have bluish color; and
- a bluish pixel count determining section configured to determine, based on results of the determining by the bluish pixel determining section, the number of pixels having bluish color,
- the intensity setting section changing, in accordance with the number of pixels determined by the bluish pixel count determining section to have bluish color, the intensity that has been set.

17. A television receiver comprising:
- a video processing device as set forth in claim 11; and
- a displaying section configured to display an image supplied from the video processing device.

18. A video processing method performed by a video processing device for reducing block noise in an image obtained by decoding a video signal, said video processing device having a frequency distribution calculating section, a variance calculating section, a difference calculating section, a pixel count calculating section, and a noise reducing section, comprising the steps of:
- (a) calculating, by the frequency distribution calculating section, a luminance frequency distribution in the image;
- (b) calculating, by the variance calculating; section, an inter-frame variance in the luminance frequency distribution calculated in the step (a);
- (c) calculating, by the difference calculating section, an inter-frame luminance difference of each of pixels of the image;
- (d) calculating, by the pixel count calculating section, the number of pixels whose inter-frame luminance differences calculated in the step (c) are each equal to or greater than a difference predetermined value; and
- (e) performing, by the noise reducing section, a block noise reduction on the image in a case where (i) the inter-frame variance calculated in the step (b) is equal to or less than a variance predetermined value and (ii) the number of pixels calculated in the step (d) is equal to or greater than a pixel-count predetermined value.

19. A computer-readable non-transitory storage medium in which a program for causing a computer to operate as a video processing device as set forth in claim 11 is stored, the program causing the computer to serve as each of the sections included in the video processing device.

* * * * *